(12) United States Patent
Case

(10) Patent No.: US 8,406,597 B2
(45) Date of Patent: Mar. 26, 2013

(54) INTELLIGENT FIBER OPTIC ADAPTER MOUNTING STRUCTURES THAT RECEIVE AND CORRECTLY POSITION MULTIPLE TYPES OF FIBER OPTIC ADAPTERS AND RELATED ADAPTER COLLARS AND BULKHEADS

(75) Inventor: Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 418 days.

(21) Appl. No.: 12/706,130

(22) Filed: Feb. 16, 2010

(65) Prior Publication Data

US 2011/0200294 A1 Aug. 18, 2011

(51) Int. Cl.
*G02B 6/00* (2006.01)
(52) U.S. Cl. .................. 385/135; 385/134; 385/139
(58) Field of Classification Search ............. 385/55–78, 385/135–139
See application file for complete search history.

(56) References Cited

U.S. PATENT DOCUMENTS

| | | | | |
|---|---|---|---|---|
| 5,274,729 | A * | 12/1993 | King et al. | 385/134 |
| 5,600,746 | A | 2/1997 | Arnett | |
| 5,647,043 | A * | 7/1997 | Anderson et al. | 385/78 |
| 5,647,045 | A * | 7/1997 | Robinson et al. | 385/135 |
| 6,208,796 | B1 * | 3/2001 | Williams Vigliaturo | 385/135 |
| 6,524,014 | B2 * | 2/2003 | Stephenson et al. | 385/55 |
| 7,144,163 | B2 * | 12/2006 | Tanaka et al. | 385/75 |
| 7,496,269 | B1 * | 2/2009 | Lee | 385/135 |
| 8,187,027 | B2 * | 5/2012 | Follingstad | 439/534 |
| 2003/0165298 | A1 * | 9/2003 | Ngo | 385/53 |
| 2005/0250379 | A1 * | 11/2005 | Coffey | 439/544 |
| 2008/0025684 | A1 * | 1/2008 | Vongseng et al. | 385/135 |
| 2009/0148105 | A1 * | 6/2009 | Sommer | 385/75 |

OTHER PUBLICATIONS

Pictures (three sheets) of prior art bulkhead (admitted prior art).
Drawings (seven sheets) of prior art adapters and adapter collar from application (admitted prior art).
SYSTIMAX Solutions M81 Series Modular Fiber Adapter with Mounting Module Datasheet, Jan. 4, 2008.
MGS-600-262 Product Specification, dated Mar. 26, 2010 (admitted prior art).
Assembly 360G2-48MPO, dated Sep. 30, 2009.
Assembly, 8 MPO Panel, dated Sep. 25, 2007.
M4800-1U-GS Product Specification, dated Mar. 26, 2010 (admitted prior art).
iP-M4200i-24 Product Specification, dated Mar. 26, 2010 (admitted prior art).

(Continued)

*Primary Examiner* — Ellen Kim
(74) *Attorney, Agent, or Firm* — Myers Bigel Sibley & Sajovec

(57) ABSTRACT

Fiber optic adapter mounting structures include a frame having a front face and a rear face, and at least first and second substantially identically-sized and shaped openings that extend through the frame. A first adapter collar is mounted in the first opening and second adapter collar is mounted in the second opening. The first and second adapter collars each have a fiber optic adapter mounting cavity that includes opposed first and second snap clip engagement surfaces therein. A first fiber optic adapter that includes first and second snap clips is mounted in the first adapter collar, and a second fiber optic adapter that includes third and fourth snap clips is mounted in the second adapter collar. The first and second fiber optic adapters are different types of fiber optic adapters that are designed to mate with different types of fiber optic cable terminations.

13 Claims, 19 Drawing Sheets

OTHER PUBLICATIONS 1000-24LC-DPLX-LS Product Specification, dated Mar. 26, 2010 (admitted prior art).
360DP-2MPO Product Specification, dated Mar. 26, 2010 (admitted prior art).
360DP-4MPO Product Specification, dated Mar. 26, 2010 (admitted prior art).
Systimax InstaPATCH 360 System product Brief, dated Mar. 26, 2010 (admitted prior art).

* cited by examiner

INTELLIGENT FIBER OPTIC ADAPTER MOUNTING STRUCTURES THAT RECEIVE AND CORRECTLY POSITION MULTIPLE TYPES OF FIBER OPTIC ADAPTERS AND RELATED ADAPTER COLLARS AND BULKHEADS

FIELD OF THE INVENTION

The present invention relates generally to fiber optic communications systems and, more particularly, to fiber optic patching systems that have intelligent patching capabilities.

BACKGROUND

Commercial data center operations use hard-wired communications systems to interconnect hundreds or thousands of servers, routers, memory storage systems and other end devices. In these data centers, fiber optic communications cables are often used to interconnect the end devices. Fiber optic communications cables are also sometimes used in dedicated communications systems that are set up by business and government entities in office buildings and other facilities (referred to herein as "office networks") that enable computers, servers, printers, facsimile machines and other electronic equipment to communicate with each other, through a private network, and with remote locations via a telecommunications service provider.

In both data center operations and office networks, the fiber optic cables that are connected to the end devices are typically terminated into one or more fiber optic patching systems that may simplify later connectivity changes. Typically, a fiber optic patching system includes a plurality of patch panels, fiber shelves, bulkhead panels, termination boxes or other structures that each include a plurality of fiber optic adapters mounted thereon (herein these structures are referred to as "fiber optic adapter mounting structures" or simply as "mounting structures"). Fiber optic communications cables are used to connect each end device to one of the fiber optic adapters that are mounted on the patch panels, fiber shelves, cartridges or other mounting structures. Additional fiber optic cables are connected between the patch panels or fiber shelves. Connectivity changes are typically made by rearranging the fiber optic cables that run between two mounting structures in order to change the connectivity between end devices.

As is known to those of skill in the art, a fiber optic adapter is a coupling device used to connect a first fiber optic communications cable that is terminated with an appropriate mating connector to (1) a second fiber optic communications cable that is terminated with an appropriate mating connector; (2) a second fiber optic communications cable that is terminated with a secondary fiber optic connector but is capable of mating and alignment by way of hybrid and/or compatible features; (3) a device. Fiber optic adapters are used, for example, to align the terminations on two fiber optic cables so that communications path(s) are provided between the fiber(s) in the first cable and the mating fiber(s) in the second cable. The adapters may provide a mechanically stable connection that precisely aligns the mating optical fibers, protects the junction between the optical fibers, and preferably exhibits a relatively low insertion loss.

One difficulty with fiber optic patching systems is that there are presently a wide variety of different fiber optic adapters in use which, in some instances, are incompatible with each other and which may vary in size, shape and/or method of connection. These fiber optic adapters include, for example, SC, LC, MPO, ST and FC fiber optic adapters. As different end devices may include different types of fiber optic adapters, some mounting structures in the fiber optic patching system may need to have more than one type of fiber optic adapter mounted thereon.

FIG. 1 is a front perspective view of a conventional duplex LC fiber optic adapter 10. FIG. 2 is a rear perspective view of the duplex LC fiber optic adapter 10.

As shown in FIGS. 1 and 2, the adapter 10 comprises a body 20 having a front portion 30 (also referred to as the "senior end") and a rear portion 40 (also referred to as the "junior end"). Ledges 22 are provided on the sides of adapter 10 at the interface between the front portion 30 and the rear portion 40. First and second plug apertures 32, 34 are provided in the front portion 30 of the adapter 10. Each of the plug apertures 32, 34 is configured to receive an LC fiber optic cable plug termination. As shown in FIG. 1, a length $L_1$ of the front portion 30 may be greater than a length $L_2$ of the rear portion 40.

As shown in FIG. 2, the rear portion 40 of the body 20 includes a rear surface that has first and second plug apertures 42, 44 that are each configured to receive an LC fiber optic cable plug termination. In the depicted embodiment, the side surfaces of the rear portion 40 include first and second cantilevered arms 36, 38 which are integrally formed with the body 20 and which form respective first and second snap clips. In another embodiment (not pictured), the first and second cantilevered arms may comprise one or more separate pieces of, for example, metal or plastic, that are physically attached to the body 20 to create a physical structure that functions as first and second snap clips. The first and second snap clips may be used to hold the LC fiber optic adapter 10 within an adapter collar (described below). Plug apertures 32 and 42 may be longitudinally aligned with each other, and plug apertures 34 and 44 may likewise be longitudinally aligned with each other. A first alignment sleeve (not visible in the figures) is positioned between plug aperture 32 and plug aperture 42 that acts to properly align the optical fibers of the plug terminations inserted into plug apertures 32 and 42, and a second alignment sleeve (not visible in the figures) is similarly positioned between plug aperture 34 and plug aperture 44 that acts to properly align the optical fibers of the plug terminations inserted into plug apertures 34 and 44.

Typically, an adapter collar is used to mount a fiber optic adapter such as adapter 10 on a mounting frame such as a patch panel, fiber shelf, termination box, bulkhead panel or the like. Herein, the term "adapter collar" refers to a structure that has at least one engagement mechanism that may be used to mount the collar on a mounting frame, and one or more openings that are each configured to receive one or more fiber optic adapters. FIG. 3 is a perspective view of a conventional adapter collar 50 that may be used to mount the LC duplex adapter 10 of FIGS. 1-2 on a patch panel or other mounting frame.

As shown in FIG. 3, the adapter collar 50 comprises a unitary body 60 that has a top surface 62, a bottom surface 64, opposed first and second side surfaces 66, 68 and a fiber optic adapter mounting cavity 70 that extends from a front 72 of the body 60 through to the rear of the body 60. The first side surface 66 includes a first cantilevered arm 76 that forms a first snap clip. The first side surface further includes a pair of ledges 78 that, in conjunction with first cantilevered arm 76, may be used to mount and lock the first side surface 66 of adapter collar 50 onto a mounting frame. The second side surface 68 likewise includes a second cantilevered arm 80 that forms a second snap clip and a pair of ledges 82 that may be used to mount and lock the second side surface 68 of adapter collar 50 onto the mounting frame.

As noted above, the adapter collar 50 may be used to mount an LC fiber optic adapter such as adapter 10 onto a mounting frame. FIG. 4 is a perspective view of an exemplary mounting frame in the form of a fiber optic patch panel 100. As shown in FIG. 4, the patch panel 100 comprises a frame 102 that includes a plurality of openings 104, each of which may receive a fiber optic adapter. Typically, adapter collars (e.g., adapter collars 50) are snap-clipped or otherwise mounted in each opening 104, and the fiber optic adapters (e.g., adapters 10) are then mounted in respective of the adapter collars. The frame 102 may comprise, for example, a stamped piece of sheet metal that is approximately one-eighth of an inch thick. Mounting apertures 106 may be provided on each end of frame 102 that may be used to mount the patch panel 100 onto an equipment rack (not shown in FIG. 4).

FIG. 4 also shows how one of the adapter collars 50 of FIG. 3 may be mounted in one of the openings 104 in frame 102. In particular, the front 72 of the adapter collar 50 is inserted into the opening 104 from the rear of the frame 102 until the first and second cantilevered arms 76, 80 snap into place on the sides of the openings 104 in frame 102. The duplex LC fiber optic adapter 10 of FIG. 2 may be mounted in the adapter collar 50 by inserting the rear portion 40 of fiber optic adapter 10 into the front of the fiber optic adapter mounting cavity 70. When the fiber optic adapter 10 is mounted in the adapter collar 50, and the adapter collar 50 is mounted on the patch panel 100, the fiber optic adapter 10 extends a distance $D_1$ in front of the frame 102, and may also extend for a distance behind the frame 102.

As noted above, fiber optic patching systems may be used in both data centers and office building communications networks to facilitate routing fiber optic cables between end devices in an organized fashion, and to simplify the process for later making changes to the connections between end devices in these networks. FIG. 5 is a simplified schematic illustration of how fiber optic patch panels (or other mounting frames) may be used to form a fiber optic patching system in a data center.

As shown in FIG. 5, a plurality of servers 110-114 are connected by fiber optic communications cables 115-119 that are terminated with, for example, SC plug connectors to a fiber optic patch panel 120. In this particular example, the patch panel 120 is a Multi-fiber Push On ("MPO") to single fiber patch panel that includes twenty-four single strand SC fiber optic adapters (which are located on the front side of patch panel 120 and hence are not visible in FIG. 5) and two multi-strand (here 12-strand) MPO fiber optic adapters 122, 124. Patch panel 120 may be used to aggregate a plurality of single strand fiber optic cables for connection to a multi-strand fiber optic cable.

"Backbone" multi-strand fiber optic cables 126 and 128 (12 strands per cable) are connected to the MPO adapters 122 and 124, respectively. These backbone cables 126, 128 are typically routed through the floor and/or ceiling of the data center, and have an MPO plug termination on each end thereof. A second MPO-to-single fiber patch panel 130 is mounted on another equipment rack that has two MPO adapters (not visible in FIG. 5) that receive the MPO backbone cables 126, 128, and twenty-four single strand SC fiber optic adapters 132 that are configured to receive single strand fiber optic cables that are terminated with an SC plug termination such as single strand fiber optic cable 134. The SC plug termination on the other end of cable 134 is plugged into a fiber optic adapter 142 on a rack-mounted network switch 140. The switch 140 provides a fiber optic communication path between the SC fiber optic adapter 142 on switch 140 that receives fiber optic cable 134 and a second SC fiber optic adapter 144 on switch 140. One end of a single strand fiber optic cable 146 that has an SC plug termination on each end thereof is received within the fiber optic adapter 144.

The fiber optic cable 146 connects the fiber optic adapter 144 on switch 140 to an SC adapter (not visible in FIG. 5) on a second rack-mounted MPO-to-single fiber patch panel 150. The MPO-to-single fiber patch panel 150 connects this single strand SC adapter to an MPO adapter 152. A backbone multi-strand fiber optic cable 154 that is terminated on each end with an MPO plug connector connects MPO adapter 152 to an MPO adapter (not visible in FIG. 5) on another MPO-to-single fiber patch panel 160. A single strand fiber optic cable 164 that is terminated on each end with an SC plug connector is plugged into an SC adapter 162 on the front side of the second patch panel 160 to connect SC adapter 162 to one of a plurality of memory storage devices 170-174 (device 170). Thus, as shown in FIG. 5, the servers 110-114 may be connected to the memory storage devices 170-174 through a series of patch panels, backbone cables, patch cords and a network switch.

As equipment is, for example, added, moved or replaced in a data center, and/or as services that are provided to particular pieces of equipment are changed, it may become necessary to make temporary and/or permanent changes to the interconnection scheme. For example, if memory storage device 170 in FIG. 5 is scheduled to be replaced with a new memory storage device, a server (e.g., server 110) that uses the first memory storage device 170 may need to be temporarily connected to a second memory storage device (e.g. memory storage device 171) until such time as the replacement for memory storage device 170 may be installed, configured, tested and brought online. The patching system depicted in FIG. 5 may provide a simple way of connecting server 110 to memory storage device 171 by changing the patching connections between, for example, the patch panel 130 and the network switch 140.

The interconnections between the various end devices, patch panels and switches of FIG. 5 are typically recorded in a computer-based log. Systems for automatically detecting and logging cabling connections between patch panels have been proposed such as, for example, the systems disclosed in U.S. Pat. Nos. 6,222,908; 6,784,802; 6,424,710 and 6,968, 994. Some of these systems for automatically tracking patching connections employ intelligent patch panels that sense when cables are plugged into, or removed from, fiber optic adapters on the panel in order to automatically track and record in a computer-based log each change to the patching connectivity.

SUMMARY

According to certain embodiments of the present invention, fiber optic adapter mounting structures are provided that include a frame having a front face and a rear face, and at least first and second substantially identically-sized and shaped openings that extend through the frame. A first adapter collar is mounted in the first opening. The first adapter collar has a fiber optic adapter mounting cavity that includes opposed first and second snap clip engagement surfaces therein. A second adapter collar is mounted in the second opening. The second adapter collar has a fiber optic adapter mounting cavity that includes opposed third and fourth snap clip engagement surface therein. A first fiber optic adapter that includes first and second snap clips is mounted in the first adapter collar, and a second fiber optic adapter that includes third and fourth snap clips is mounted in the second adapter collar. The first and second fiber optic adapters are different types of fiber optic adapters that are designed to mate with different types of fiber optic cable terminations.

In some embodiments, the fiber optic adapter mounting structure may further include a first sensor that is configured to sense whether a cable is plugged into the first adapter collar and a second sensor that is configured to sense whether a cable is plugged into the second adapter collar. The first and second snap clip engagement surfaces may comprise, for example, respective first and second ledges that each have a major axis that is substantially normal to both the longitudinal axis and the transverse axis of the first fiber optic adapter that is mounted within the fiber optic adapter mounting cavity of the first adapter collar. These first and second ledges may be recessed rearwardly from a front opening of the fiber optic adapter mounting cavity of the first adapter collar. In some embodiments, these first and second ledges may be positioned approximately in the middle of the fiber optic adapter mounting cavity. Moreover, the third and fourth snap clip engagement surfaces may include respective third and fourth ledges that each have a major axis that is substantially normal to both the longitudinal axis and the transverse axis of the second fiber optic adapter that is mounted within the fiber optic adapter mounting cavity of the second adapter collar, and the first through fourth ledges may be positioned so that the first and second fiber optic adapters extend substantially the same distance forward from the front face of the frame.

In some embodiments, the first and second adapter collars may both be configured so that each adapter collar can receive and hold in place either a rear portion of an LC duplex fiber optic adapter or a rear portion of an MPO adapter. In some embodiments, the first fiber optic adapter may be mounted in the first adapter collar so that the first and second snap clips are on a front side of the first and second snap clip engagement surfaces, and the second fiber optic adapter may be mounted in the second adapter collar so that the third and fourth clips are on a rear side of the third and fourth snap clip engagement surfaces. The first and second sensors, if included, may be mounted on a printed circuit board that extends forwardly from the front face of the frame, where the first and second fiber optic adapters are mounted such that neither the first fiber optic adapter nor the second fiber optic adapter projects into a plane that is parallel to the front face of the frame that passes through the front surfaces of the first and second sensors.

Pursuant to further embodiments of the present invention, fiber optic adapter mounting structures are provided which include a frame having a front surface, a rear surface, and at least a first opening therein that extends from the front surface and through the rear surface. A first bulkhead is mounted in the first opening, and is configured to be mounted in the first opening from the front surface of the frame so that a rear portion of the first bulkhead extends through the rear of the first opening. The first bulkhead has a plurality of fiber optic adapter mounting cavities, where each fiber optic adapter mounting cavity includes first and second snap clip engagement ledges on opposed side surfaces thereof. A plurality of fiber optic adapters are mounted in respective ones of the fiber optic adapter mounting cavities by snap engagement to respective ones of the first and second snap clip engagement ledges.

In some embodiments, each of the first and second snap clip engagement ledges may be recessed rearwardly from a front face of the bulkhead. The front surface of each of the plurality of fiber optic adapters may be substantially co-planar with the front face of the bulkhead. The fiber optic adapter mounting structure may further include a plurality of sensors that are mounted on the front surface of the frame, where a sensor is provided for each of the fiber optic adapter mounting cavities. A first and a second of the plurality of fiber optic adapters may be designed to mate with different types of fiber optic cable terminations.

Pursuant to still further embodiments of the present invention, adapter collars are provided that include a body having a top surface, a bottom surface, opposed first and second side surfaces and a fiber optic adapter mounting cavity that extends from a front of the body through to the rear of the body. These adapter collars further include a first abutment that extends outwardly from the first side surface that is configured to mate with a first edge of an opening in a frame and a second abutment that extends outwardly from the second side surface that is configured to mate with a second edge of the opening in the frame. First and second snap clip engagement ledges extend inwardly from respective first and second side surfaces of the fiber optic adapter mounting cavity, and are positioned in a middle portion of the fiber optic adapter mounting cavity that is between the front and rear of the body. The fiber optic adapter mounting cavity is sized to receive both an MPO fiber optic adapter and a duplex LC fiber optic adapter.

In some embodiments, the adapter collars may further include a first recessed area in the first side surface of the fiber optic adapter mounting cavity that is configured to receive a first snap clip of a fiber optic adapter that is received within the fiber optic adapter mounting cavity, and a second recessed area in the second side surface of the fiber optic adapter mounting cavity that is configured to receive a second snap clip of a fiber optic adapter that is received within the fiber optic adapter mounting cavity. The adapter collars may also include a labelling surface on a front face of the collar either above or below the fiber optic adapter receiving cavity. In some embodiments, the first abutment has a ramped front surface and a rear surface that is normal to first side surface of the body, and the second abutment has a ramped front surface and a rear surface that is normal to second side surface of the body.

DETAILED DESCRIPTION

Figure 1:
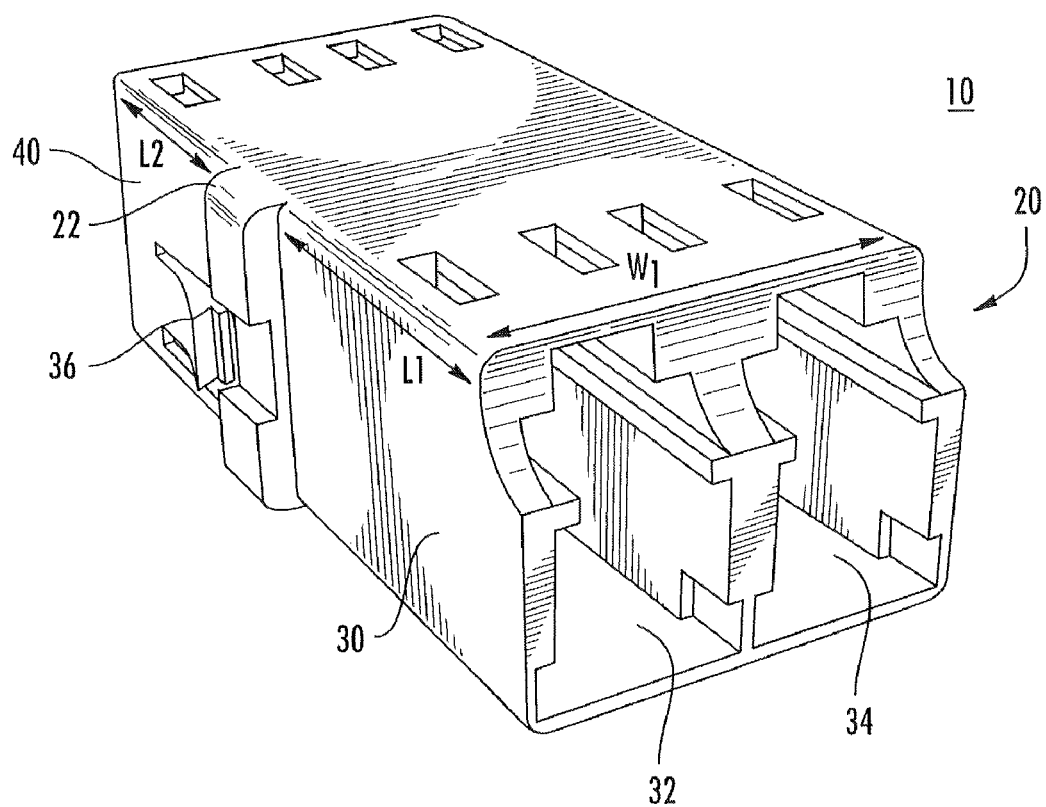
FIG. 1 is a front perspective view of a conventional duplex LC fiber optic adapter.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "front" or "back" or "above" or "below" may be used herein to describe a relationship of one element to another element as illustrated in the figures. It will be understood that these terms are intended to encompass different orientations of the device in addition to the orientation depicted in the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. It will be further understood that the terms "comprises" "comprising," "includes" and/or "including," when used herein, specify the presence of stated elements or components, but do not preclude the presence or addition of one or more other elements, components, and/or groups thereof.

Herein, references to the "longitudinal axis" of a fiber optic adapter refer to the direction in which a plug connector of a communications cable is moved when being inserted into one of the plug apertures of the adapter. References to the "transverse axis" of a fiber optic adapter refer to an axis that is normal to the longitudinal axis and which is normal to the opposed side surfaces of the fiber optic adapter.

Herein, references to "snap clips" refer to cantilevered arms or surfaces of a device that are made from resilient material such that the distal end of the cantilevered arm or surface may bend inwardly or outwardly to fit over or around a mating surface, then recover to lock the device (either by itself or in conjunction with other elements) to the mating surface. As noted above, the cantilevered arms or surfaces may be formed integral with the body of the device or may comprise one or more pieces that are separate from the device that are connected to the device. Herein a "snap clip engagement surface" refers to the mating surface that a snap clip bends to fit over or around.

Pursuant to embodiments of the present invention, fiber optic adapter mounting structures such as patch panels, fiber shelves, bulkhead panels, termination boxes and the like are provided that may receive multiple different types of fiber optic adapters, and which also include capabilities for sensing when fiber optic cables are inserted into, or removed from, the fiber optic adapters that are mounted on the mounting structure in order to facilitate automatically tracking patching changes. The mounting structures according to embodiments of the present invention may use adapter collars that are configured to receive multiple different types of fiber optic adapters, and to position these different fiber optic adapters in a manner that allows sensors that are provided on the mounting structure to operate properly.

Figure 6:
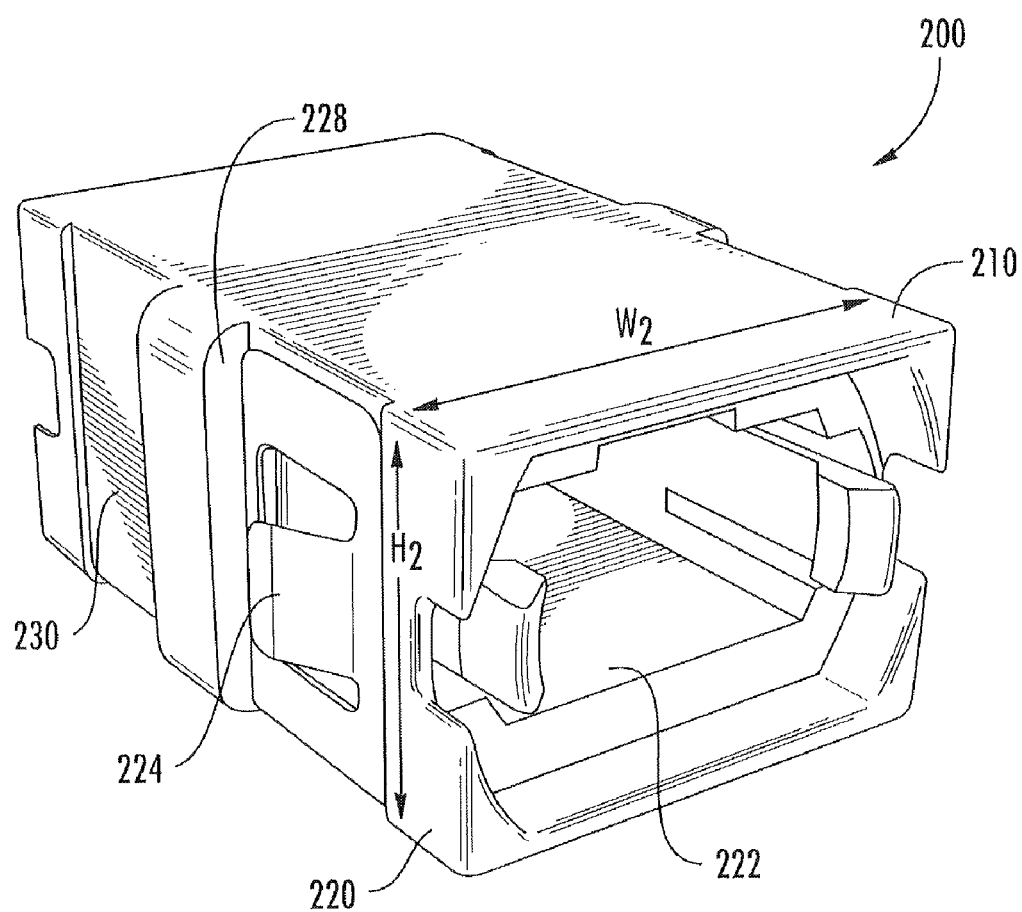
FIG. 6 is a rear perspective view of a conventional MPO fiber optic adapter.
Figure 7:
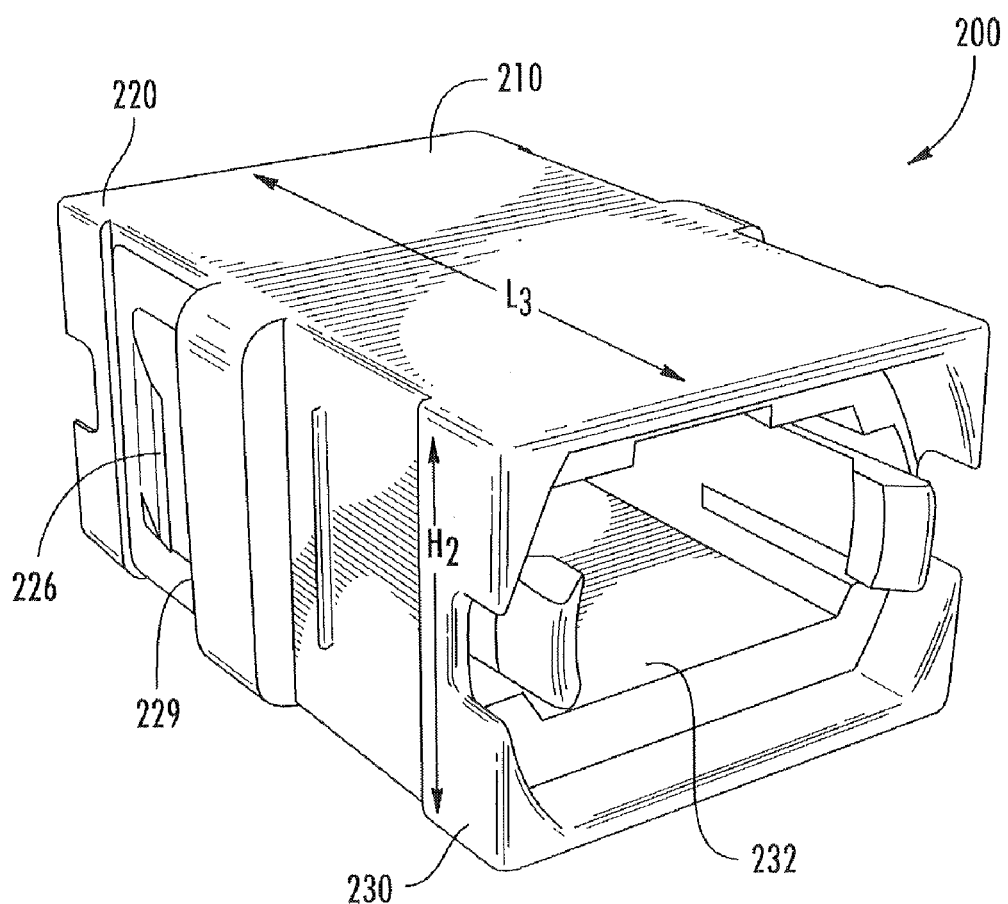
FIG. 7 is a front perspective view of the MPO fiber optic adapter of FIG. 6.

Before describing the fiber optic adapter mounting structures and related adapter collars according to embodiments of the present invention, it is helpful to describe a second commonly used type of fiber optic adapter, namely an MPO adapter. FIG. 6 is a rear perspective view of a conventional MPO adapter 200. FIG. 7 is a front perspective view of the MPO adapter 200. As shown in FIGS. 6-7, the adapter 200 comprises a body 210 having a rear portion 220 and a front portion 230. The rear portion 220 includes a first plug aperture 222 that is configured to receive a fiber optic cable having an MPO plug termination. The rear portion 220 further includes a first cantilever arm 224 that is mounted on a first side of the rear portion 220 and a second cantilever arm 226 that is mounted on a second side of the rear portion 220. In the depicted embodiment, the first and second cantilever arms 224, 226 are formed from a single piece of stamped metal that is bent to extend around the bottom and two sides of the rear portion 220 to fit within recesses in the bottom and side surfaces of the rear portion 220. In their normal resting positions, the distal ends of cantilever arms 224, 226 extend outwardly from the respective side surfaces of the MPO adapter 200. First and second ledges 228, 229 extend from the respective sides of the rear portion 220, and are located slightly forward of the distal ends of the cantilever arms 224, 226.

Figure 2:
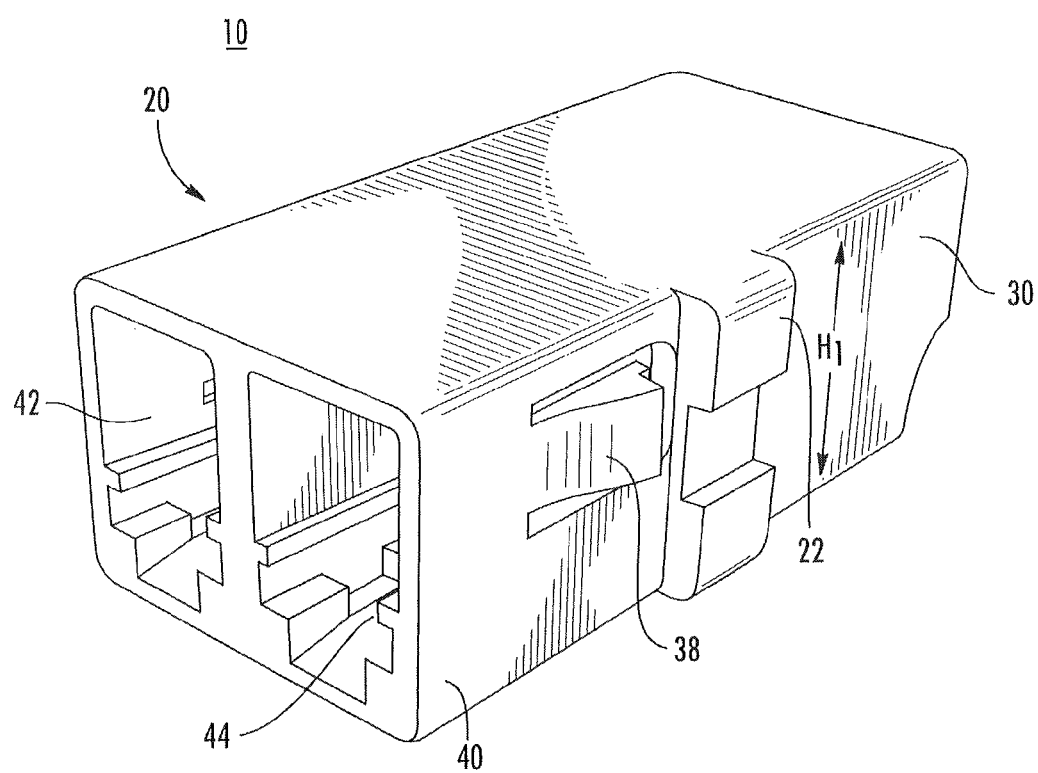
FIG. 2 is a rear perspective view of the LC fiber optic adapter of FIG. 1.

The front portion 230 includes a second plug aperture 232 (see FIG. 7) that is also configured to receive a fiber optic cable having an MPO plug termination. The front portion 230 of the body 210 may be identical to the rear portion 220, except that the cantilever arms 224, 226 are only provided on the rear portion 220. Typically the width ($W_2$) of the MPO adapter 200 will be approximately the same as the width ($W_1$) of the duplex LC adapter 10 discussed above with respect to FIGS. 1 and 2, and the height ($H_2$) of the MPO adapter 200 will be approximately the same as the height ($H_1$) of the duplex LC adapter 10 However, the length ($L_3$) of the MPO adapter 200 will typically be less than the length ($L_1+L_2$) of the duplex LC adapter 10. Due to this difference, LC adapters and MPO adapters are typically mounted into different sized openings on mounting structures such as patch panels, and different adapter collars are typically used to mount LC and MPO adapters onto such mounting structures.

Figure 8:
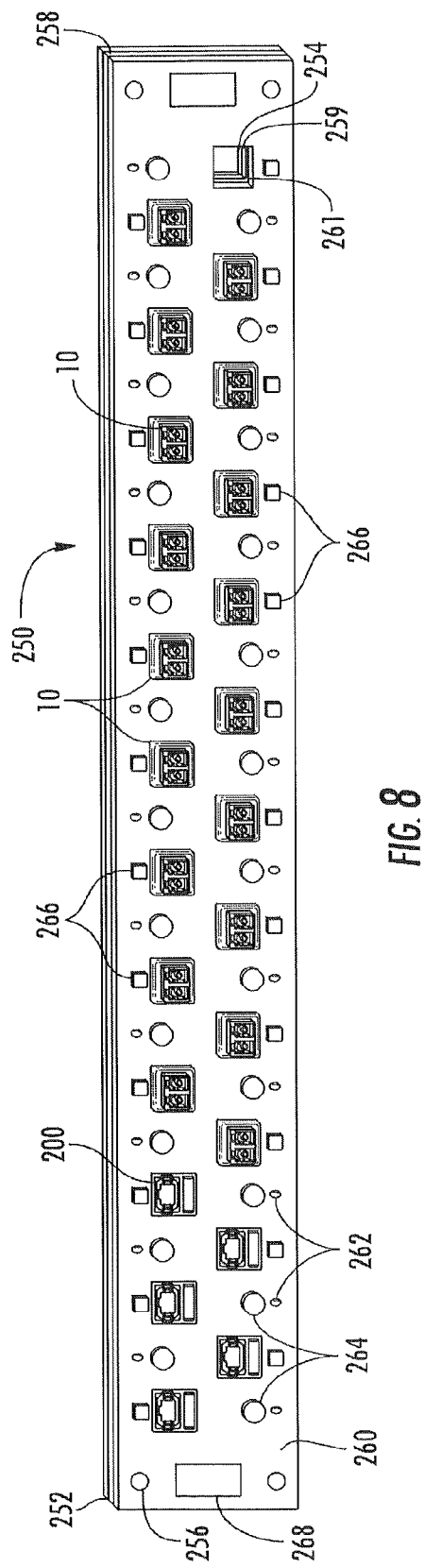
FIG. 8 is a front perspective view of an intelligent fiber optic patch panel according to embodiments of the present invention.
Figure 9:
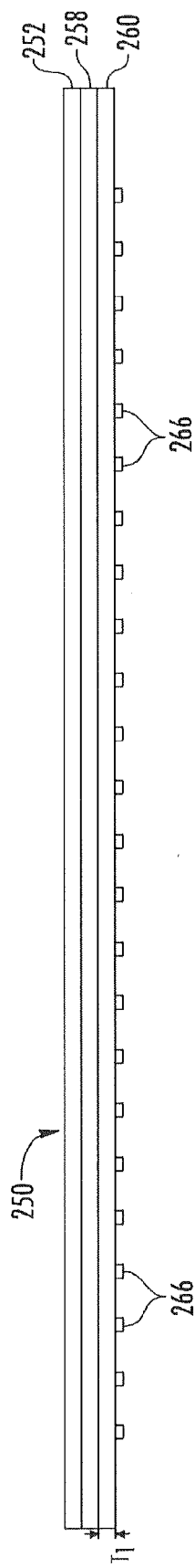
FIG. 9 is a top view of the patch panel of FIG. 8.

FIG. 8 is a perspective view of an intelligent fiber optic patch panel 250 according to embodiments of the present invention. FIG. 9 is a top view of the patch panel 250.

As shown in FIG. 8, the patch panel 250 includes a mounting frame 252 that has a plurality of openings 254 therein. The openings 254 may be arranged in an alternating "checkerboard" fashion. The mounting frame 252 may comprise, for example, an elongated, rectangular piece of sheet metal that is approximately $\frac{1}{8}^{th}$ of an inch thick. The frame 252 may include apertures 256 at either end thereof that may be used to mount the patch panel 250 on an equipment rack or other structure.

A plastic frame 258 is mounted (via, for example, screws) on a front face of the mounting frame 252. The plastic frame 258 includes a plurality of openings 259, each of which may aligned with, and at least slightly smaller than, the respective openings 254 in the mounting frame 252. A printed circuit board 260 is mounted (via, for example, an adhesive) on the front face of the plastic frame 258. The printed circuit board 260 includes a plurality of cut-out areas 261 that expose the openings 259 in the plastic frame 258. A plurality of light emitting diodes ("LEDs") 262 and a plurality of trace buttons 264 are provided on the printed circuit board 260, and are arranged to either be directly above or directly below respective ones of the cut-out areas 261. Additionally, a sensor 266 is mounted on the printed circuit board 260 either above or below each of the cut-out areas 261. In the embodiment depicted in FIG. 8, each sensor 266 comprises an optical emitter-detector device 266 that emits a light beam and detects any optical light that is reflected back into the detector portion of the device. In another exemplary embodiment (not pictured), the optical emitter-detector devices 266 may be replaced with an optical emitter that is mounted on one side of each cut-out area 261, and an optical detector that is mounted on the other side of each cut-out area 261 that is aligned to receive light emitted by the optical emitter. A microprocessor 268 is also mounted on the printed circuit board 260, and may be electrically connected to each of the LEDs 262, trace buttons 264 and sensors 266 via conductive traces (not shown in FIGS. 8-9) on the printed circuit board 260. Finally, the printed circuit board 260 may include a connection to an external processor (not shown in the figures).

As shown in FIG. 8, an adapter collar 300 (which is described in detail below) is mounted in all but one of the openings 259 in the plastic frame 258. The openings 259 in the plastic frame 258 may be sized to mate with mounting structures on the adapter collar 300 (described below) that hold each adapter collar 300 in place within its respective opening 259 in the plastic frame 258. As noted above, the openings 254 in the metal mounting frame 252 may be larger than the openings 259 so that the rear portion of each adapter collar 300 may extend through the rear of mounting frame 252. In some embodiments, the front face of the adapter collar 300 may be generally flush with a front face of the printed circuit board 260. In other embodiments, each adapter collar 300 may be mounted so that it is rotated 90 degrees (in either direction) or 180 degrees from the orientation depicted in FIG. 8.

Each adapter collar 300 has a fiber optic adapter 10 or 200 mounted therein. As shown in FIG. 8, some of the adapter collars 300 hold MPO adapters 200 in place on the patch panel 250, while other adapter collars 300 hold duplex LC adapters 10 in place on the patch panel 250. In the particular embodiment illustrated in FIGS. 8 and 9, the patch panel 250 includes a total of twenty-four (24) openings 254/259/261, twenty-three (23) of which hold a fiber optic adapter 10 or a fiber optic adapter 200. As shown in FIG. 9, each fiber optic adapter 10, 200 is mounted so that it does not extend forwardly beyond the front of the printed circuit board 260.

As shown in the plan view of FIG. 9, the printed circuit board 260 and any adhesive layer (not shown) that is used to mount the printed circuit board 260 on the mounting frame 252 may have a thickness $T_1$. Each of the sensors 266 is mounted so as to extend forwardly from the printed circuit board 260, and hence each sensor is more than the distance $T_1$ from the front face of the plastic frame 258. When a fiber optic cable is terminated into one of the fiber optic adapters 10, 200, the sensor 266 will be located either directly above or directly below the fiber optic cable. The sensors 266 may comprise, for example, optical emitter-detector devices 266 that emit a light beam and detect any optical light that is reflected back into the detector portion of the device. The optical emitter-detectors 266 are positioned so that they will emit the light beam onto any fiber optic cable that is plugged into the fiber optic adapter 10, 200 that the emitter-detector 266 is mounted above or below. Some of the light from the light beam will be reflected back into the emitter-detector 266 by the fiber optic cable, and the emitter-detector 266 interprets this detection of the reflected light as indicating that a fiber optic cable is present in the adapter 10, 200 associated with the sensor 266. If no fiber optic cable is plugged into the associated adapter 10, 200, sufficient light will not be reflected back into the emitter-detector 266 to result in the emitter-detector 266 detecting the reflected light, which serves as an indication that no fiber optic cable is plugged into the fiber optic adapter 10, 200 associated with the emitter-detector 266.

Figure 3:
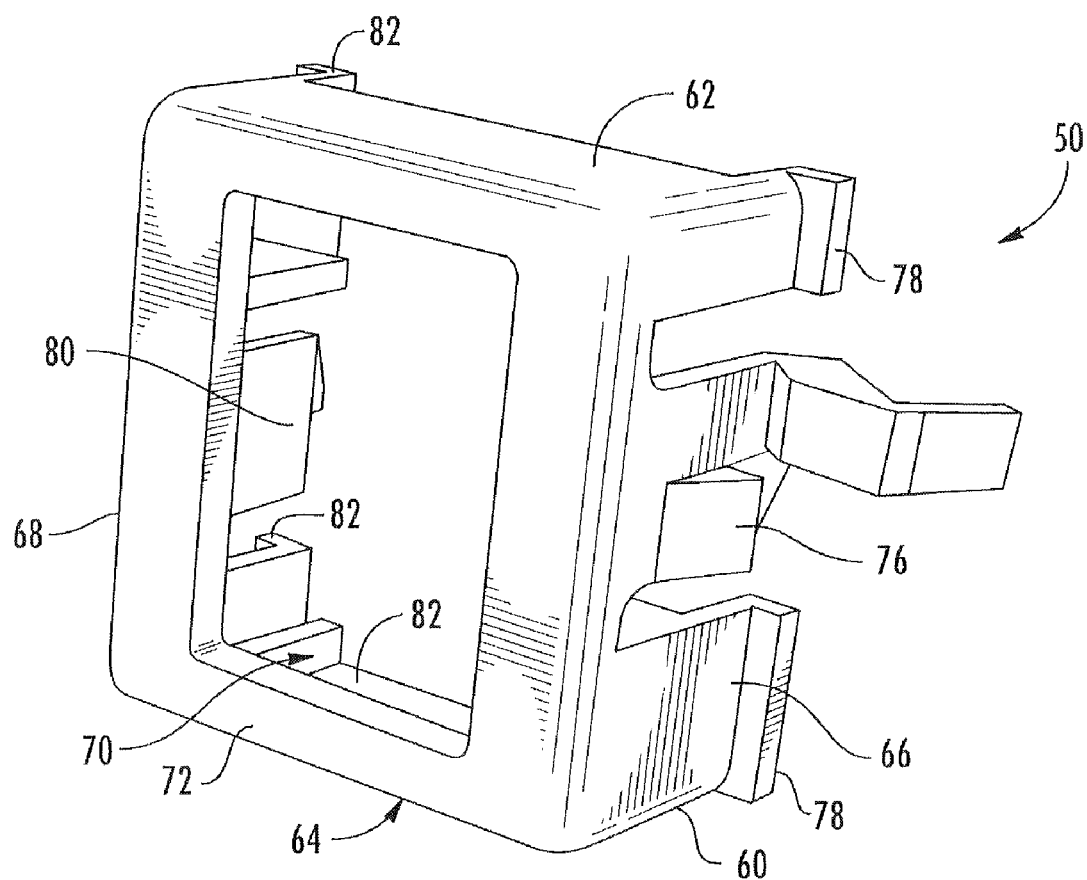
FIG. 3 is a perspective view of a conventional adapter collar.
Figure 4:
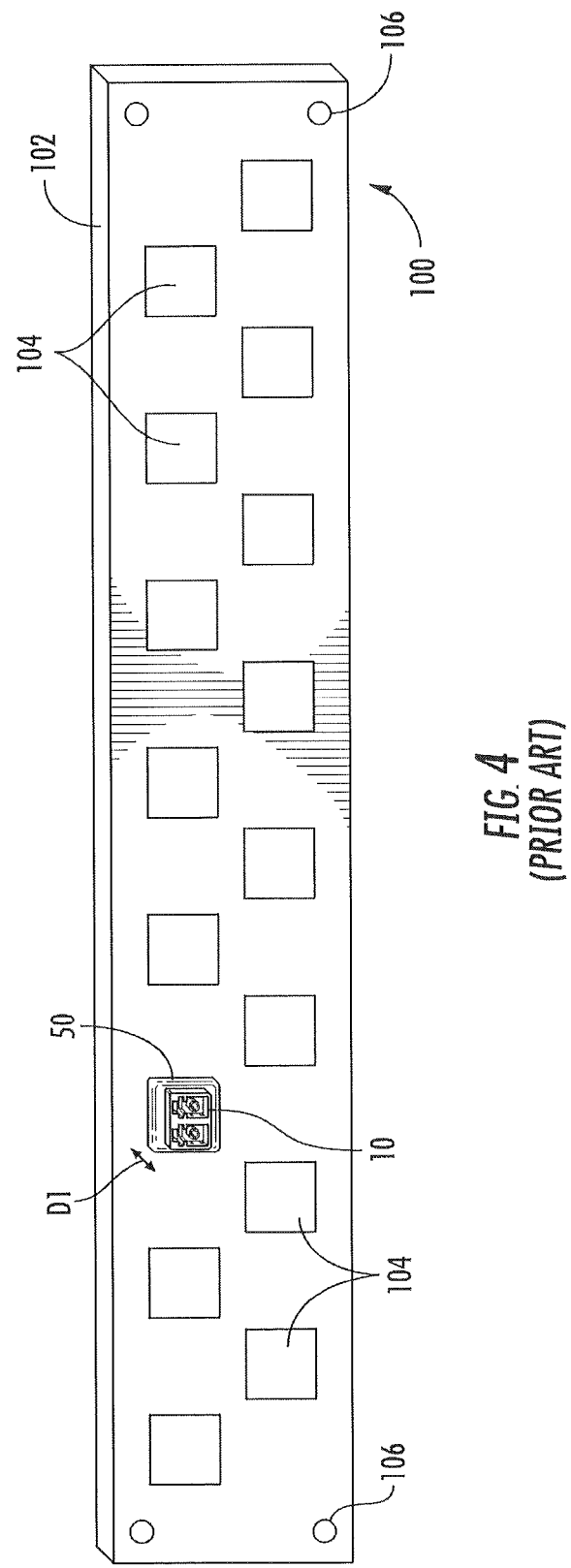
FIG. 4 is a perspective view of a fiber optic patch panel having one of the adapter collars of FIG. 3 and one of the LC fiber optic adapters of FIGS. 1-2 mounted thereon.
Figure 5:
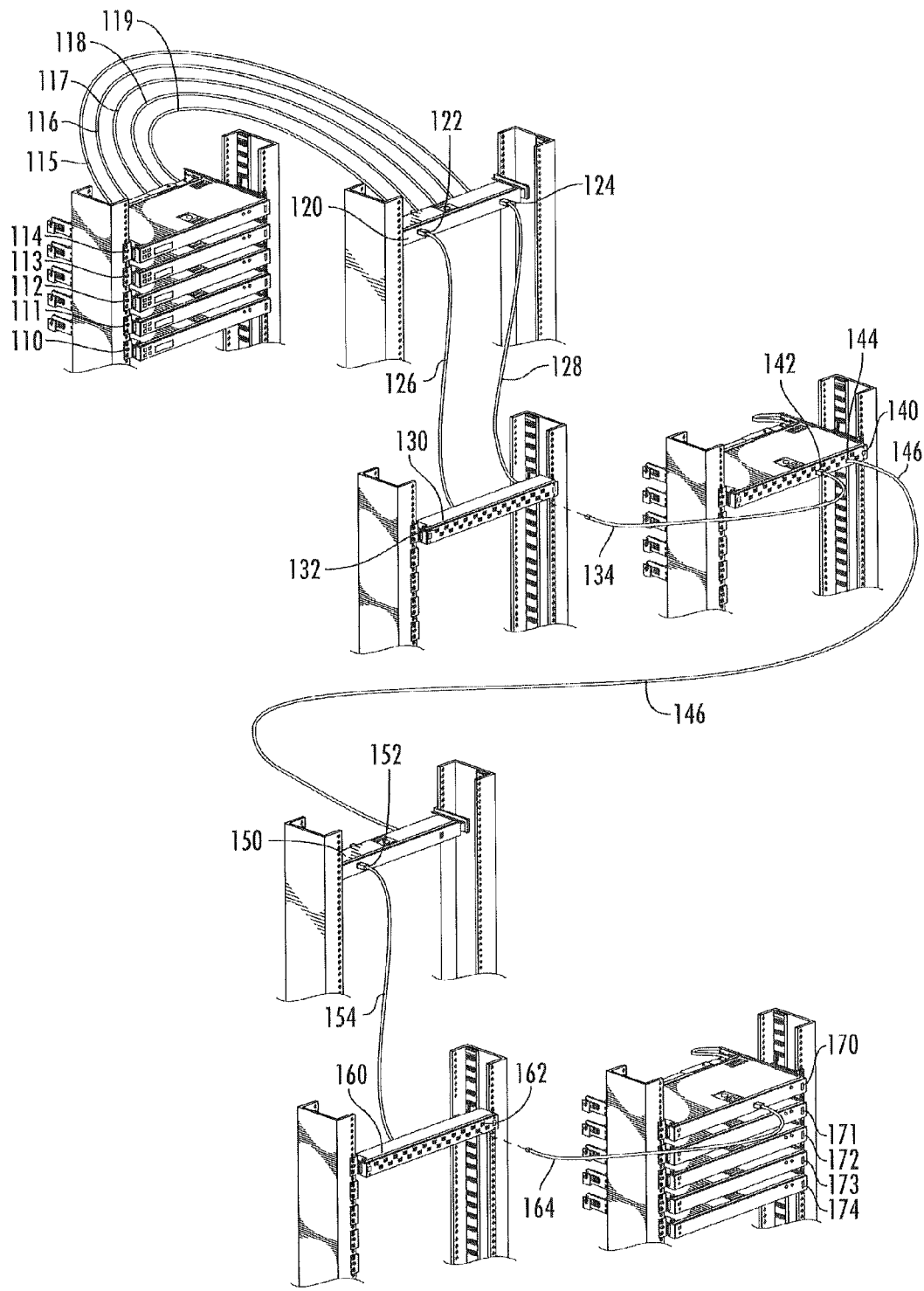
FIG. 5 is a simplified schematic view of a fiber optic patching system.

As shown in FIG. 4 above, when conventional adapter collars such as collar 50 are used to mount fiber optic adapter such as adapter 10 on a patch panel such as patch panel 100, the adapter 10 protrudes for a distance (e.g., $D_1$) in front of the frame 102 of the patch panel 100. This distance $D_1$ may be greater than the thickness $T_1$ of the printed circuit board 260. As a result, if the adapter collars 50 of FIG. 3 are used to mount fiber optic adapters on the patch panel 250, the adapter collars 50 may extend too far forwardly so that the adapter collars 50 (or a fiber optic adapter mounted in the adapter collar) block the light beams emitted by the emitter-detectors 266. If this occurs, the emitter-detectors 266 will not operate properly, as they would always register that a fiber optic cable was plugged into the adapter, as each emitter-detector 266 would register the light reflected by its associated adapter collar 50 as indicating that a cable was plugged into the adapter collar 50. Consequently, conventional adapter collars may not work properly with intelligent patch panels or other intelligent mounting structures that use sensors to detect cable insertions and removals.

Additionally, in many situations, it may be desirable to have multiple different types of fiber optic adapters mounted on the same mounting structure. When conventional adapter collars are used, this may require having a mounting structure with different sized openings that are sized to fit adapters collars that are configured to hold the different types of fiber optic adapters. Unfortunately, this can greatly increase the number of mounting structures and adapter collars that must be manufactured and maintained in inventory.

Figure 10:
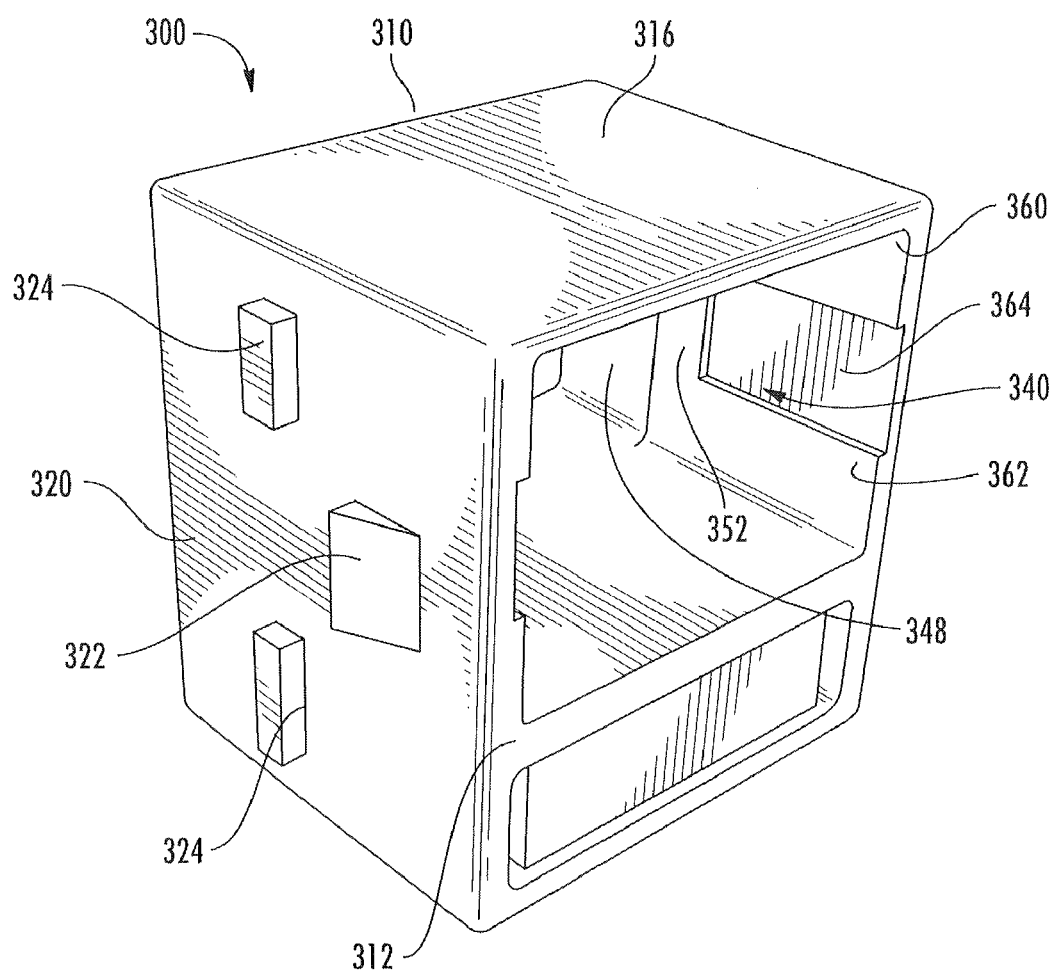
FIG. 10 is a front perspective view of an adapter collar according to embodiments of the present invention.
Figure 11:
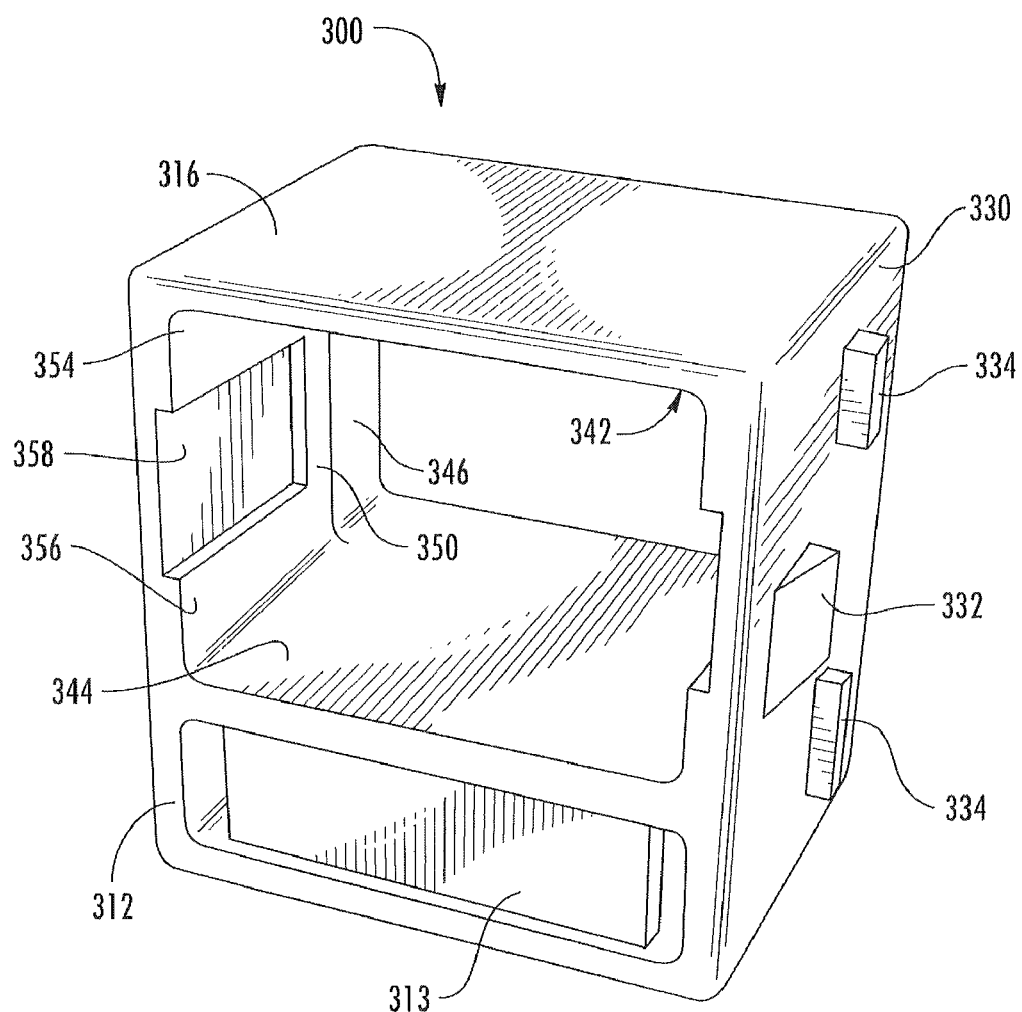
FIG. 11 is a second front perspective view of the adapter collar of FIG. 10.
Figure 12:
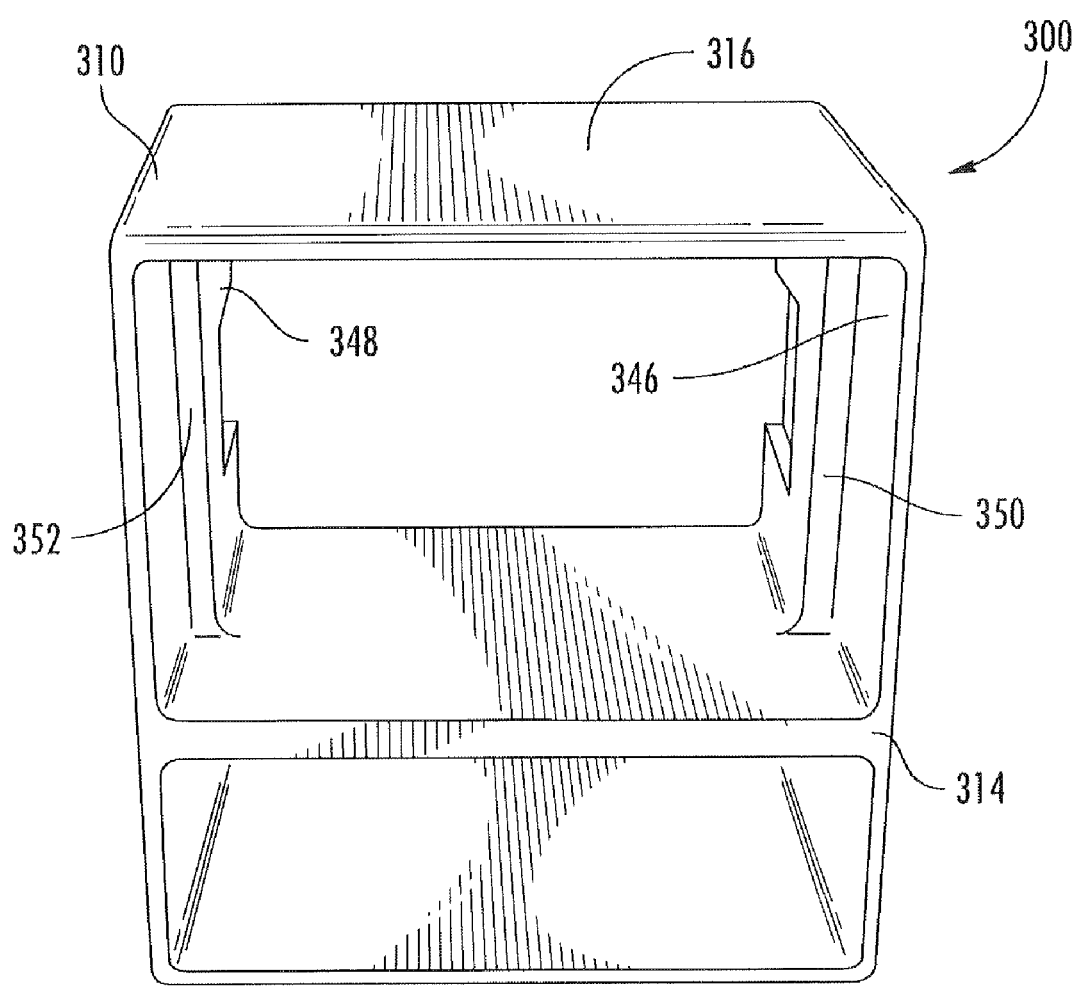
FIG. 12 is a rear view of the adapter collar of FIG. 10.

FIG. 10 is a front perspective view of an adapter collar 300 according to embodiments of the present invention. FIG. 11 is a second front perspective view of the adapter collar 300. FIG. 12 is a rear view of the adapter collar 300.

As shown in FIGS. 10-12, the adapter collar 300 comprises a unitary body 310 that has a front face 312, a rear face 314, a top surface 316, a bottom surface, opposed first and second side surfaces 320, 330 and a fiber optic adapter mounting cavity 340 that extends from the front surface 312 of the body 310 through to the rear surface 314 of the body 310. The first side surface 320 includes a first ramped abutment 322 and a pair of first ledges 324. The second side surface 330 includes a second ramped abutment 332 and a pair of second ledges 334. The second ramped abutment 332 may be identical to the first ramped abutment 322 and the second ledges 334 may be identical to the first ledges 324. The front surface 312 of the adapter collar 300 may be inserted through the rear of an opening in a mounting structure (e.g., one of the openings 254/259/261 of the patch panel 250 of FIGS. 8-9) such that the first and second ramped abutments 322, 332 come into contact with the side edges of the openings 259 in the plastic frame 258. The body 310 may be formed of a somewhat resilient material such that the side surfaces 320, 330 and/or the first and second ramped abutments 322, 332 may deform sufficiently to allow the adapter collar 300 to be inserted through the rear of the opening 259 such that the ramped abutments 322, 332 may pass through to the front side of the opening 259. The ledges 324, 334 prevent the adapter collar 300 from being pushed forwardly farther through the opening 259, and the back surfaces of the ramped abutments 322, 332 (which are not ramped, but instead are perpendicular to the side surfaces 320, 330) prevent the adapter collar 300 from moving rearwardly through the opening 259. Stated differently, once the first and second ramped abutments 322, 332 have been pushed through the opening 259 in the patch panel 250, the first side edge of the opening 259 is captured between the non-ramped back surface of abutment 322 and the front surfaces of the ledges 324, and the second side of the opening 259 is captured between the non-ramped back surface of abutment 332 and the front surfaces of ledges 334, thereby locking the adapter collar 300 in place in the opening 259.

The front face 312 of adapter collar 300 includes a labelling surface 313. A label strip (not shown) formed of clear plastic may be mounted over the labelling surface 313, with a piece of paper with a printed label mounted between the label strip and the labelling surface 313. In other embodiments, a molded label icon (also not shown) may be mounted on the labelling surface 313, where the label icon includes, for example, a symbol that conveys certain information. The label strip and/or label icon may each snap mount onto the labelling surface 313. The fiber optic adapter mounting cavity 340 is positioned directly above the labeling surface 313. In some embodiments, the fiber optic adapter mounting cavity 340 may have a solid top wall 342, a solid bottom wall 344, and solid opposed side walls 346, 348 (as is the case in the embodiment of FIGS. 10-12), while in other embodiments, the fiber optic adapter mounting cavity 340 may have top 342, bottom 344 and side walls 346, 348 that have cut-out areas. A first vertically-oriented ledge 350 is provided on the first side wall 346 of the fiber optic adapter mounting cavity 340, and a second vertically-oriented ledge 352 is provided on the second side wall 348 of the fiber optic adapter mounting cavity 340. The ledges 350, 352 may be positioned in a central or rear portion of the side walls 346, 348. As discussed below, the placement of the ledges 350, 352 may be made to facilitate mounting more than one type of adapter in the fiber optic adapter mounting cavity 340.

Additionally, first and second spaced-apart horizontally-oriented ledges 354, 356 (see FIG. 11) may also be provided on the first side wall 346 of the fiber optic adapter mounting cavity 340. The ledges 350, 354, 356 may define a recessed area 358 that receives one of the cantilever arms of an adapter that is mounted in the adapter collar 300 (e.g., cantilever arm 224 of MPO adapter 200). First and second spaced-apart horizontally-oriented ledges 360, 362 (see FIG. 10) may also be provided on the second side wall 348 of the fiber optic adapter mounting cavity 340. The ledges 352, 360, 362 may define a second recessed area 364 that receives the second cantilever arm of an adapter that is mounted in the adapter collar 300 (e.g., cantilever arm 226 of MPO adapter 200).

Due the differences in length of duplex LC adapters and MPO adapters, if conventional adapter collars were used to mount both an LC and an MPO adapter in a patch panel or other mounting structure, the LC adapter would typically extend farther out the front of the patch panel than would the MPO adapter. If the adapters are to be used on a patch panel or other mounting structure that has intelligent patching capabilities, the LC adapters may stick out too far in front of the mounting structure such that the adapter blocks sensors that are included on the mounting structure. Additionally, as discussed above, typically separate adapter collars would need to be used for the MPO and LC adapters.

Figure 13:
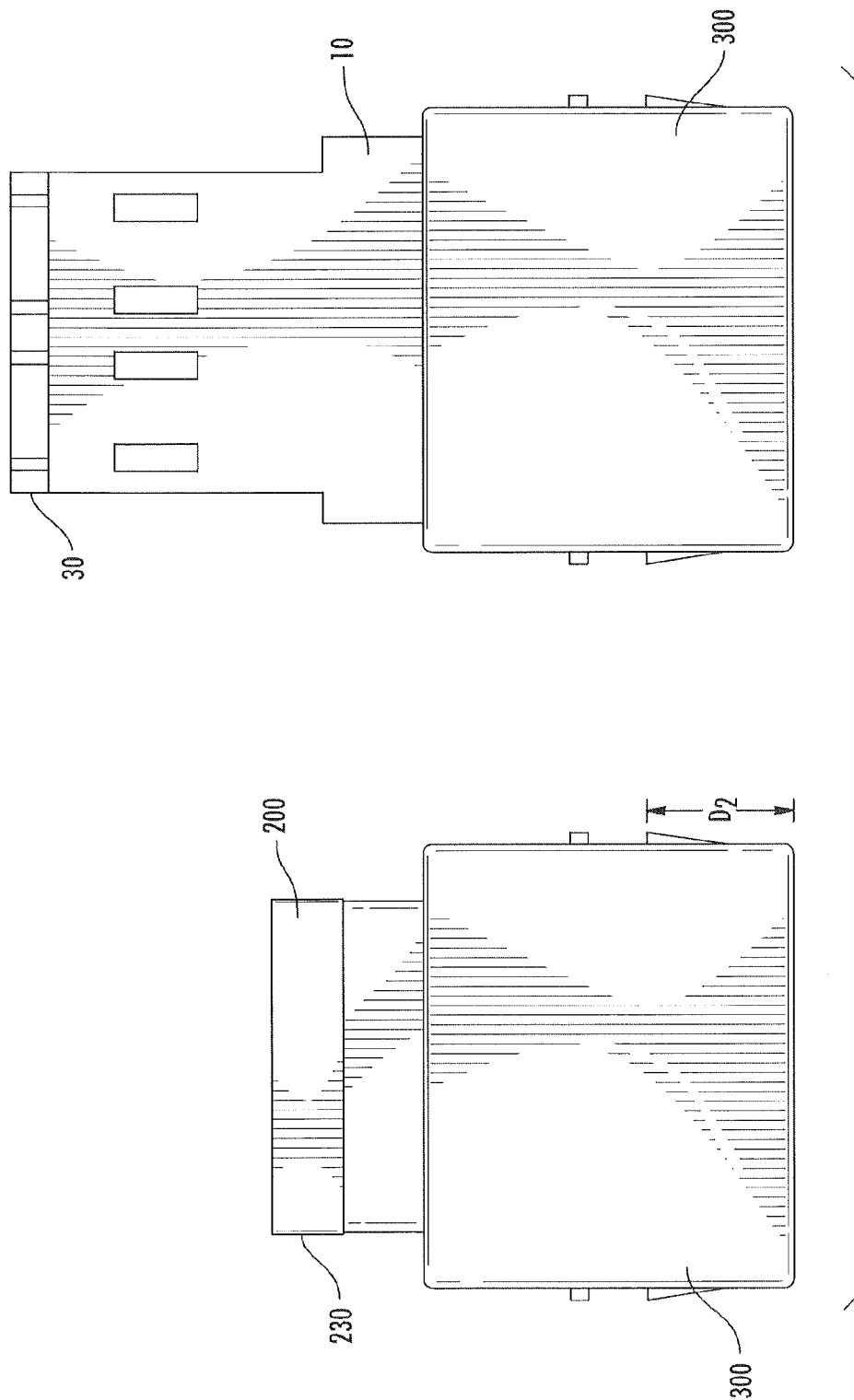
FIG. 13 is a top view of two of the adapter collars of FIG. 10, one of which holds the duplex LC fiber optic adapter of FIGS. 1-2 and the other of which holds the MPO fiber optic adapter of FIGS. 6-7.
Figure 14:
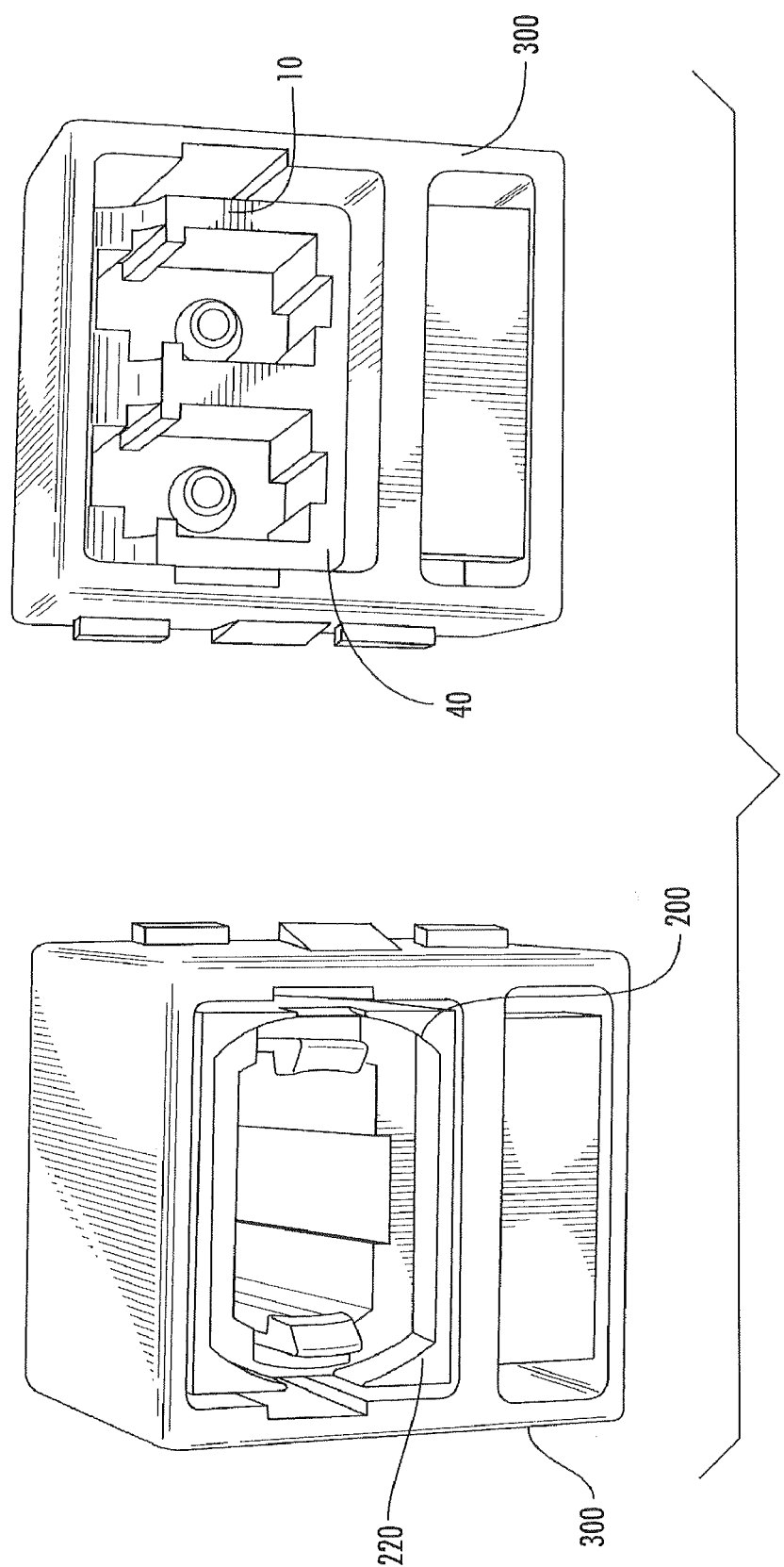
FIG. 14 is a front view of the adapter collars and fiber optic adapters of FIG. 13.

FIG. 13 is a top view of two of the adapter collars 300 of FIGS. 10-12, one of which holds an LC duplex adapter 10 and the other of which holds an MPO adapter 200. FIG. 14 is a front view of the two adapter collars and adapters of FIG. 13. FIGS. 13-14 illustrate how the adapter collar 300 may be used to mount either an LC adapter 10 or an MPO adapter 200 on a patch panel or other mounting structure.

Referring to FIGS. 6-7 and 10-14, the rear portion 220 of MPO adapter 200 may be inserted into the fiber optic adapter mounting cavity 340 from the rear of adapter collar 300. As the MPO adapter 200 is inserted into the fiber optic adapter mounting cavity 340, the base portions of cantilever arms 224, 226 engage the vertically-oriented ledges 350, 352, respectively, and the ledges 350, 352 push the distal ends of cantilever arms 224, 226 inwardly toward the side surfaces of MPO adapter 200, thereby allowing the adapter 200 to be inserted through the fiber optic adapter mounting cavity 340. As the MPO adapter 200 is inserted farther into the fiber optic adapter mounting cavity 340, the distal ends of the cantilever arms 224, 226 eventually pass the ledges 350, 352, respectively, at which point the distal ends of arms 224, 226 snap back into their normal resting position. Once this occurs, the MPO adapter 200 may only be inserted a slight distance farther into the fiber optic adapter mounting cavity 340, as ledges 228, 229 of MPO adapter 200 come into contact with the rear surface of ledges 350, 352, respectively, of adapter collar 300, thereby preventing the MPO adapter 200 from being inserted any farther forwardly into the adapter collar 300. As the cantilever arms 224, 226 have returned to normal resting positions, the distal ends of cantilever arms 224, 226 engage the front surface of ledges 350, 352, thereby preventing the MPO adapter 200 from being moved in the rearward direction through the fiber optic adapter mounting cavity 340.

In this manner, the MPO adapter 200 is locked in place in the adapter collar 300 until such time that the cantilever aims 224, 226 are manually pushed inwardly to unlock the MPO adapter 200 from the adapter collar 300. As shown in FIGS. 13-14, once the MPO adapter 200 is locked into the adapter collar 300, the front face of the adapter 200 is approximately flush with the front face 312 of adapter collar 300.

FIGS. 1-2 and 10-14 illustrate how the conventional duplex LC fiber optic adapter 10 can be received by the adapter collar 300. As shown in FIG. 13, the rear portion 40 of LC adapter 10 is inserted into the fiber optic adapter mounting cavity 340 from the rear of adapter collar 300. As the LC adapter 10 is inserted into the fiber optic adapter mounting cavity 340, the base portions of cantilever arms 36, 38 engage the vertically-oriented ledges 350, 352, respectively, and the ledges push the distal ends of cantilever arms 36, 38 inwardly, thereby allowing the rear portion 40 of LC adapter 10 to be pushed further through the fiber optic adapter mounting cavity 340. As the LC adapter 10 is inserted further into the fiber optic adapter mounting cavity 340, the distal ends of the cantilever arms 36, 38 eventually pass the ledges 350, 352, respectively, at which point the distal ends of arms 36, 38 snap back into their normal resting position. Once this occurs, the LC adapter 10 may only be inserted a slight distance farther into the fiber optic adapter mounting cavity 340, as the ledges 22 at the rear of the front portion 30 of LC adapter 10 come into contact with the ledges 350, 352, respectively, of adapter collar 300, thereby preventing the adapter 10 from being inserted any further forwardly into the adapter collar 300. As the cantilever arms 36, 38 have returned to their normal resting positions, the distal ends of cantilever arms 36, 38 engage the ledges 350, 352, thereby preventing the LC adapter from being moved rearwardly through the fiber optic adapter mounting cavity 340. In this manner, the LC adapter 10 is locked in place in the adapter collar 300 until such time that the cantilever arms 36, 38 are manually pushed inwardly to unlock the LC adapter 10 from the adapter collar 300. As shown in FIGS. 13-14, once the LC adapter 10 is locked into the adapter collar 300, the front face of the adapter 10 is approximately even with the front face 312 of adapter collar 300.

Figure 15:
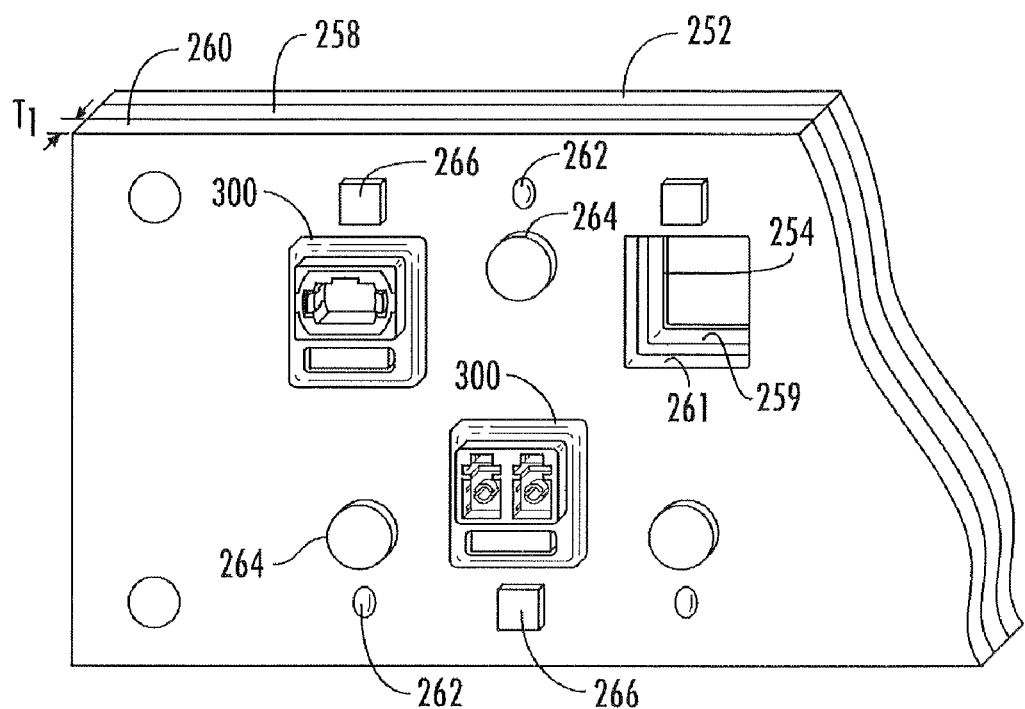
FIG. 15 is a perspective view of a portion of the patch panel of FIGS. 8-9 in which two of the adapter collars of FIGS. 10-12 are used to mount the MPO fiber optic adapter of FIGS. 6-7 and the LC fiber optic adapter of FIGS. 1-2.

FIG. 15 is an enlarged perspective view of a portion of the patch panel 250 of FIGS. 7-8 in which two adapter collars 300 have been used to mount an MPO adapter 200 and an LC adapter 10 onto the patch panel 250. As shown in FIG. 15, the openings 261 in the printed circuit board 260 that expose the openings 259 in plastic frame 258 are wider than the openings 259. Consequently, each adapter collar 300 snaps directly onto the plastic frame 258. As shown in FIG. 13, the rear face of abutments 322, 332 of the adapter collars 300 are positioned a distance $D_2$ from the front face 312 of the adapter collar 300. Consequently, the front face 312 of each adapter collar 300 extends the distance $D_2$ in front of the front face of the plastic frame 258. In some embodiments, the distance $D_2$ may be approximately equal to the distance $T_1$ (which is the thickness of the printed circuit board 260). In these embodiments, the front face 312 of each adapter collar 300 may be substantially coplanar with the front face of the printed circuit board 260. In other embodiments, the distance $D_2$ may be less than the distance $T_1$, and thus the front face 312 of each adapter collar 300 may be recessed with respect to the front face of the printed circuit board 260. In still other embodiments, the distance $D_2$ may be greater than the distance $T_1$ so that the front face 312 of each adapter collar 300 extends forwardly beyond the front face of the printed circuit board 260, but does not extend far enough forwardly so as to block the light emitted by the sensors 266. In each of these cases, the adapter collars 300 may be designed so that they do not block the light emitted from the sensors 266.

Moreover, since the fiber optic adapters 10 and 200 may both be mounted to be substantially flush with the front face 312 of the adapter collars 300, the adapters 10, 200 likewise will not block the light emitted from the sensors 266. Thus, the adapter collars 300 may be used to mount multiple different types of fiber optic adapters on a mounting structure, and may do so in a manner that does not interfere with sensors that may be mounted on the front of the mounting structure for detecting cable insertions and removals.

Pursuant to further embodiments of the present invention, adapter collars that hold multiple fiber optic adapters are provided. In some embodiments, the adapter collar may comprise a bulkhead panel 400 that is configured to be inserted into a fiber shelf, back panel, termination box or the like. Bulkhead panels are often used to connect a plurality of fan-out cables (which plug into the front side of the adapters mounted on the bulkhead panel 400) to a plurality of trunk cables (which plug into the rear side of the adapters mounted on the bulkhead panel 400). The bulkhead panels 400 according to embodiments of the present invention may facilitate automatically identifying patching connections at the bulkhead panels.

Figure 16:
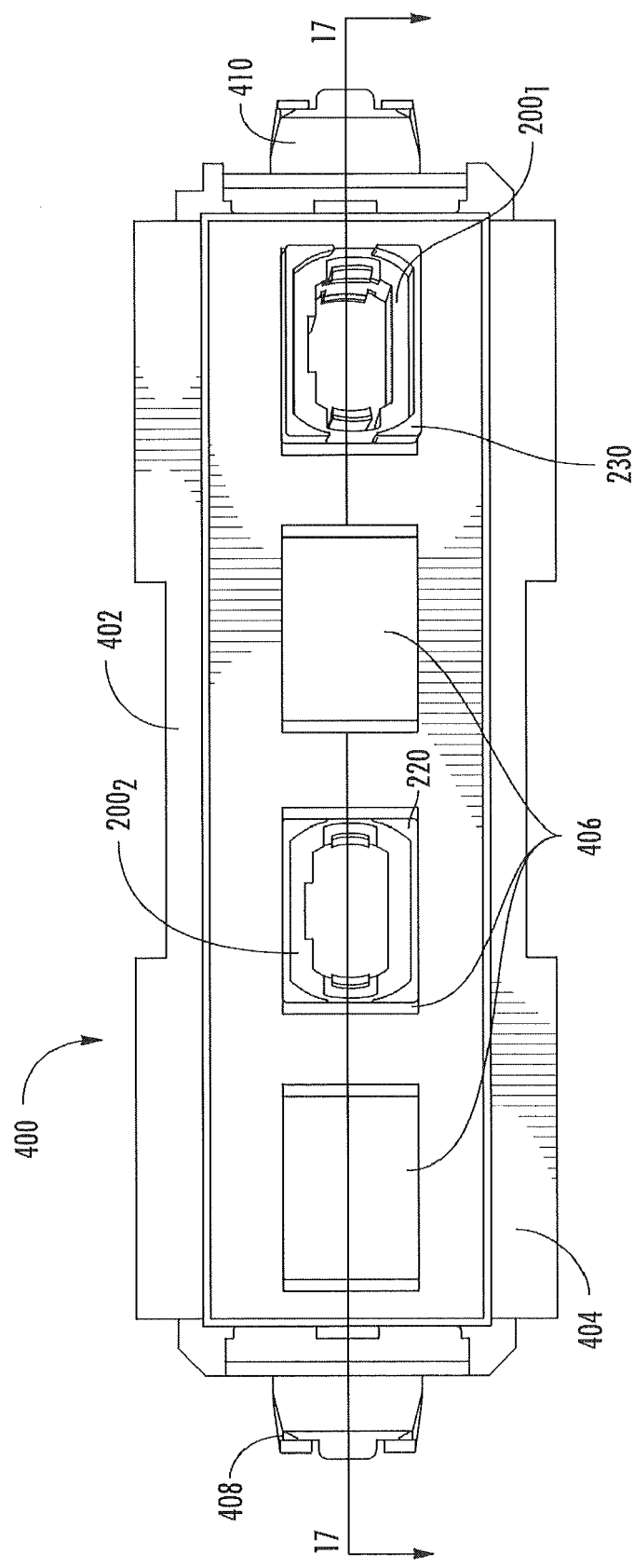
FIG. 16 is a front perspective view of a bulkhead panel according to embodiments of the present invention.
Figure 17:
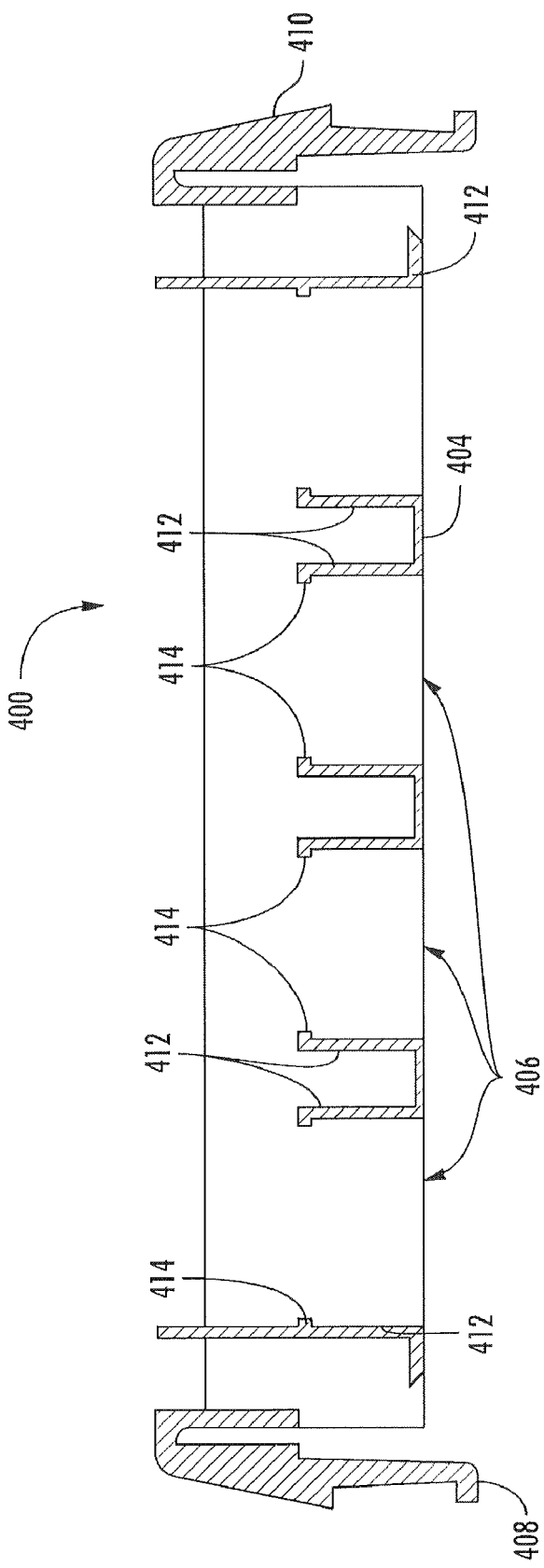
FIG. 17 is a cross-sectional view of the bulkhead panel of FIG. 16 taken along the line 17-17.
Figure 18:
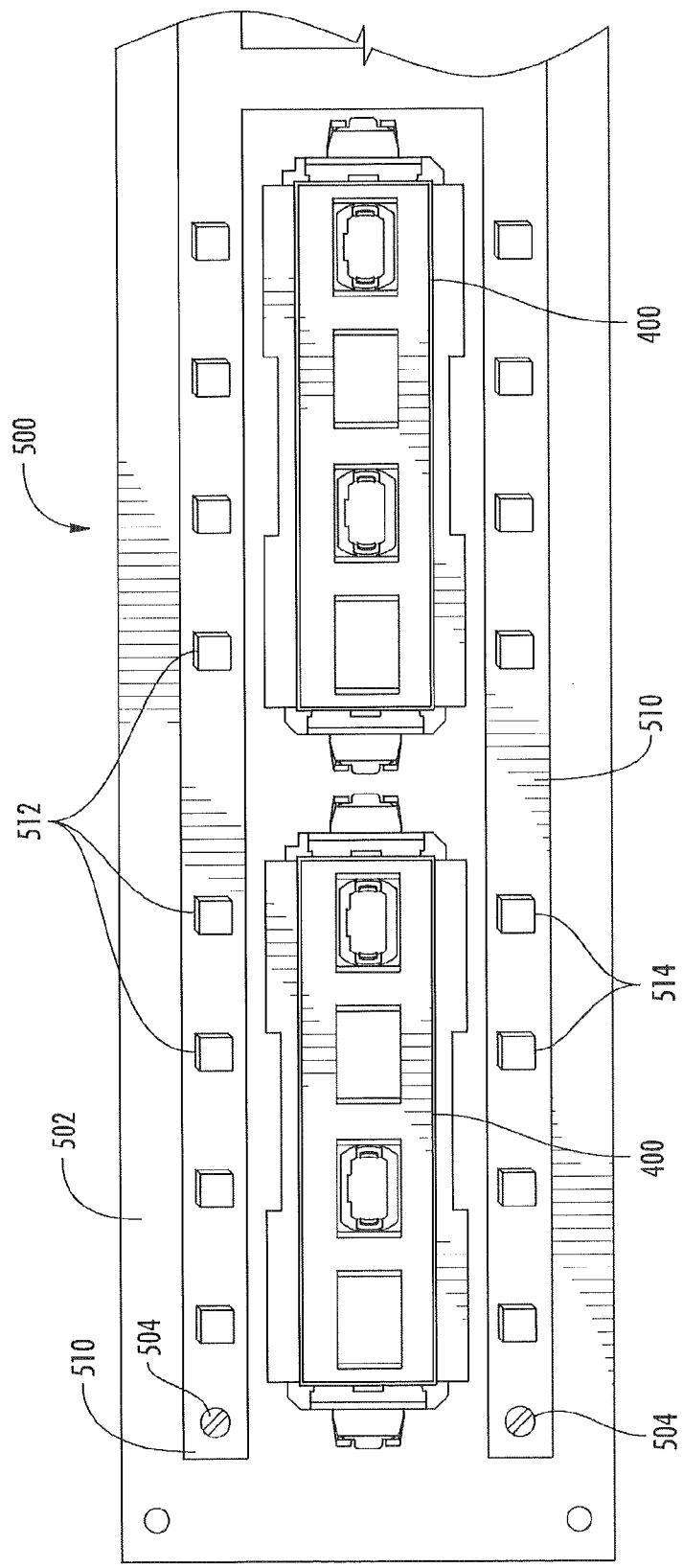
FIG. 18 is a front perspective view of an intelligent patch panel having two of the bulkhead panels of FIGS. 16-17 installed therein.

FIG. 16 is a front perspective view of a bulkhead panel 400 according to embodiments of the present invention that has two MPO fiber optic adapters $200_1$, $200_2$ installed therein. FIG. 17 is a cross-sectional view taken along the line 17-17 of FIG. 16 (with the fiber optic adapters 200 omitted). FIG. 18 is a perspective view of an intelligent patch panel 500 having two bulkhead panels 400 installed therein.

As shown in FIG. 16, the bulkhead panel 400 has a body portion 402 having a front face 404 and four fiber optic adapter mounting cavities 406. A first cantilever arm 408 extends from a first side of the bulkhead panel 400, and a second cantilever arm 410 extends from the opposite side of the panel 400. The first and second arms may be used to mount bulkhead panel 400 onto a mounting structure such as the patch panel 500 of FIG. 18, As shown in FIG. 17, the first and second arms may extend forward of the front face 400 of the bulkhead panel 400.

As can be seen best in the cross-sectional view of FIG. 17, each fiber optic adapter mounting cavity 406 has first and second side walls 412. A ledge 414 is provided on each side wall 412. The ledges 414 extend slightly into their associated fiber optic adapter mounting cavity 406. As shown in FIG. 17, the ledges 414 are set back from the front face 404 of the bulkhead panel 400. The snap clip engagement structures of each fiber optic adapter (e.g. the cantilever arms 224, 226 and ledges 228, 229 on fiber optic adapter 200) engage the ledges 414 to lock each fiber optic adapter into its respective fiber optic adapter mounting cavity 406.

Referring again to FIG. 16, it can be seen that first and second fiber optic adapters $200_1$ and $200_2$ are mounted in respective first and second of the fiber optic adapter mounting cavities 406. For purposes of illustration, these fiber optic adapters are mounted in different orientations. Fiber optic adapter $200_1$ is mounted by inserting the rear portion 220 of adapter $200_1$ into the rear of the fiber optic adapter mounting cavity 406. When inserted in this fashion, it can be seen that the rear face of fiber optic adapter $200_1$ is substantially coplanar with the front face 404 of the bulkhead panel 400. In contrast, fiber optic adapter $200_2$ is mounted by inserting the rear portion 220 of adapter $200_2$ into the front of the fiber optic adapter mounting cavity 406. When inserted in this fashion, it can be seen that the front face of the front portion 230 of fiber optic adapter $200_2$ extends forwardly beyond the front face 404 of the bulkhead panel 400, although not as far as when the adapter 200 is inserted in a conventional manner into a conventional patch panel. Thus, the MPO adapters 200 can be installed in the bulkhead panel 400 in two different ways.

FIG. 18 is a perspective view of a portion of a fiber optic patch panel 500 that has a intelligent patching printed circuit board 510 mounted on a front side 502 thereof. As shown in FIG. 18, a pair of bulkhead panels 400 are mounted on the patch panel 500, and the printed circuit board 510 is configured to extend both above and below the bulkhead panels 400. The printed circuit board 510 may be mounted by, for example, screws 504 to the front face 502 of the patch panel 500.

As shown in FIG. 18, a plurality of optical emitters 512 are mounted to extend from an upper portion of the printed circuit board 510, with each of these emitters mounted directly over one of the fiber optic adapter mounting cavities 406 of the bulkhead panels 400. Likewise, a plurality of optical detectors 514 are mounted to extend from a lower portion of the printed circuit board 510, with each of these detectors 514 mounted directly under one of the fiber optic adapter mounting cavities 406 of the bulkhead panels 400 so as to be aligned underneath a corresponding one of the optical emitters 512. A microprocessor is also mounted on the printed circuit board 510 (not visible in FIG. 18), and each of the optical detectors 514 is electrically connected to the microprocessor by traces (not shown in FIG. 18) on the printed circuit board 510. The optical emitters 512 are configured to emit a beam of light that will be received by the corresponding optical detector 514 that is positioned underneath each optical emitter 512, so long as no fiber optic cable is present that blocks the emitted light beam.

Figure 19:
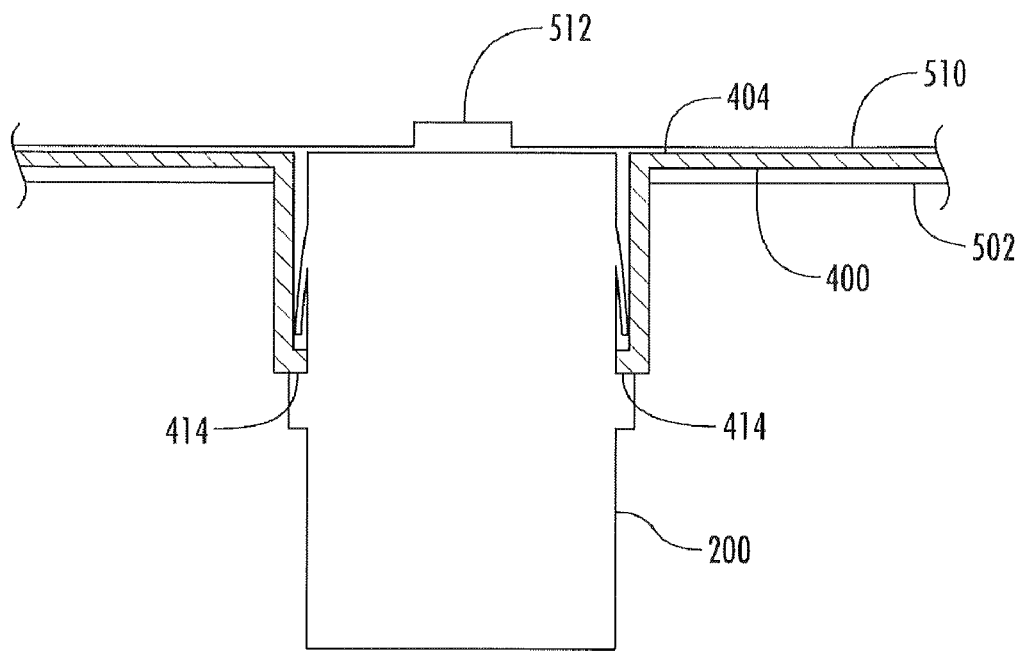
FIG. 19 is a schematic cross-sectional top view of a portion of the intelligent patch panel of FIG. 18 that has an MPO fiber optic adapter mounted therein.

The bulkhead panel 400 is mounted on the patch panel 500 so that the front face 404 of bulkhead panel 400 does not extend as far forward as does the front face of the printed circuit board 510. FIG. 19, which is a top cross-sectional view of a portion of a bulkhead panel 400 having an MPO adapter 200 mounted therein, illustrates the relative positions of the front face 404 of the bulkhead panel, the ledges 414, the printed circuit board 510, the optical emitters 512 and the MPO adapter 200. As shown in FIG. 19, by positioning the ledges 414 to be set back from the front face 404 of the bulkhead panel 400, the front face of each fiber optic adapter 200 that is mounted in the bulkhead panel may be set back from the front face of the fiber shelf 500. As such, the adapters 200 will not block the light beams emitted by the optical emitters 512. Accordingly, the bulkhead panels 400 facilitate adding intelligent patching capabilities to fiber optic adapter mounting structures such as patch panel 500.

Moreover, both MPO adapters 200 and duplex LC adapters 10 can be received in the fiber optic adapter mounting cavities 406 of the bulkhead panels 400. Similar to the MPO adapters 200, the rear portion 40 of the duplex LC adapters 10 can be inserted into the rear of one of the fiber optic adapter mounting cavities 406, and the adapter 10 does not extend forwardly farther than the front face of the printed circuit board 510. As such, the adapters 10 likewise will not block the light beams emitted by the optical emitters 512, even if the emitters 512 and/or detectors 514 are mounted flush with the front face of the printed circuit board 510. In some embodiments, simplex SC adapters may also be received and correctly positioned in the fiber optic adapter mounting cavities 406 so as to allow proper operation of the optical emitters 512 and detectors 514.

In some embodiments, the printed circuit board 510 may comprise part of an upgrade kit that can be mounted on a patch panel or other mounting structure to upgrade the mounting structure to have the capability to sense the insertions and deletions of fiber optic cables into and out of the fiber optic adapters mounted on the mounting structure using the bulkhead panels.

With conventional bulkhead panels, the fiber optic adapters are typically mounted so that the front of the adapter extends some distance in front of the bulkhead panel. As discussed above, if the fiber optic adapters protrude too far forwardly, they can interfere with proper operation of the sensors. Thus, pursuant to embodiments of the present invention, bulkhead panels are provided which are configured so that the front face of the fiber optic adapters mounted therein may be approximately co-planar with the front face of the bulkhead panel.

It will be appreciated that that the adapter collars, bulkheads and fiber optic adapter mounting structures described above could be modified in numerous ways. For example, while the adapter collars described above include ramped abutments and ledges on the sides thereof that are used to mount to the adapter collars to the various mounting structures (which are sometimes referred to as "RJ-45 style" attachment mechanisms), it will be appreciated that in other embodiments different types of attachment mechanism may used such as, for example, keystone style attachment mechanism. Likewise, while embodiments of the present invention have primarily been described with respect to MPO and duplex LC fiber optic adapters, it will be appreciated that in further embodiments additional types of fiber optic adapters could also be used. It will also be appreciated that the location of the vertically-oriented ledges within the fiber optic adapter receiving cavity may be varied so that the forward most portion of each adapter will be in a desired location.

Likewise, while the embodiments described above used optical sensors, it will be appreciated that other types of sensors may be used such as, for example, infrared sensors. It will also be appreciated that the fiber optic adapters may be molded into the bulkheads in some embodiments (or otherwise attached thereto), and/or the bulkheads may be molded into a mounting structure such as a shelf (or otherwise attached thereto). It will also be appreciated that different materials may be used than described herein. For example, the bulkheads could be formed of metal instead of plastic. The bulkheads likewise could be attached by screws or adhesive as opposed to through the use of cantilevered arms. In some embodiments, the bulkheads may hold a group of adapters (e.g., a six pack) within a single opening rather than holding a plurality of adapters in a plurality of individual openings.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A fiber optic adapter mounting structure, comprising
 a frame having a front face and a rear face, and at least first and second substantially identically-sized and shaped openings that extend through the frame;
 a first adapter collar mounted in the first opening, the first adapter collar having a fiber optic adapter mounting cavity that includes opposed first and second snap clip engagement surfaces therein;
 a second adapter collar mounted in the second opening, the second adapter collar having a fiber optic adapter mounting cavity that includes opposed third and fourth snap clip engagement surface therein;
 a first fiber optic adapter that includes first and second snap clips mounted in the first adapter collar;

a second fiber optic adapter that includes third and fourth snap clips mounted in the second adapter collar;

wherein the first and second fiber optic adapters are different types of fiber optic adapters that are designed to mate with different types of fiber optic cable terminations.

2. The fiber optic adapter mounting structure of claim 1, further comprising a first sensor that is configured to sense whether a cable is plugged into the first adapter collar and a second sensor that is configured to sense whether a cable is plugged into the second adapter collar.

3. The fiber optic adapter mounting structure of claim 2, wherein the first and second snap clip engagement surfaces comprise respective first and second ledges that each have a major axis that is substantially normal to both the longitudinal axis and the transverse axis of the first fiber optic adapter that is mounted within the fiber optic adapter mounting cavity of the first adapter collar.

4. The fiber optic adapter mounting structure of claim 3, wherein the first and second ledges are recessed rearwardly from a front opening of the fiber optic adapter mounting cavity of the first adapter collar.

5. The fiber optic adapter mounting structure of claim 3, wherein the first and second ledges are positioned approximately in the middle of the fiber optic adapter mounting cavity of the first adapter collar.

6. The fiber optic adapter mounting structure of claim 3, wherein the third and fourth snap clip engagement surfaces comprise respective third and fourth ledges that each have a major axis that is substantially normal to both the longitudinal axis and the transverse axis of the second fiber optic adapter that is mounted within the fiber optic adapter mounting cavity of the second adapter collar, and wherein the first through fourth ledges are positioned so that the first and second fiber optic adapters extend substantially the same distance forward from the front face of the frame.

7. The fiber optic adapter mounting structure of claim 3, wherein the first and second adapter collars are both configured so that each adapter collar can receive and hold in place either a rear portion of an LC duplex fiber optic adapter or a rear portion of an MPO adapter.

8. The fiber optic adapter mounting structure of claim 1, wherein the first fiber optic adapter is mounted in the first adapter collar so that the first and second snap clips are on a front side of the first and second snap clip engagement surfaces, and the second fiber optic adapter is mounted in the second adapter collar so that the third and fourth clips are on a rear side of the third and fourth snap clip engagement surfaces.

9. The fiber optic adapter mounting structure of claim 2, wherein the first and second sensors are mounted on a printed circuit board that extends forwardly from the front face of the frame, wherein the first fiber optic adapter is mounted such that it does not project into a plane that is parallel to the front face of the frame that passes through the front surface of the first sensor, and wherein the second fiber optic adapter is mounted such that it does not project into a plane that is parallel to the front face of the frame that passes through the front surface of the second sensor.

10. An adapter collar, comprising:
a body having a top surface, a bottom surface, opposed first and second side surfaces and a fiber optic adapter mounting cavity that extends from a front of the body through to the rear of the body;
a first abutment extending outwardly from the first side surface that is configured to mate with a first edge of an opening in a frame;
a second abutment extending outwardly from the second side surface that is configured to mate with a second edge of the opening in the frame;
first and second snap clip engagement ledges extending inwardly from respective first and second side surfaces of the fiber optic adapter mounting cavity, wherein the first and second snap clip engagement ledges are in a middle portion of the fiber optic adapter mounting cavity that is between the front and rear of the body;
wherein the fiber optic adapter mounting cavity is sized to receive both an MPO fiber optic adapter and a duplex LC fiber optic adapter.

11. The adapter collar of claim 10, further comprising a first recessed area in the first side surface of the fiber optic adapter mounting cavity that is configured to receive a first snap clip of a fiber optic adapter that is received within the fiber optic adapter mounting cavity, and a second recessed area in the second side surface of the fiber optic adapter mounting cavity that is configured to receive a second snap clip of a fiber optic adapter that is received within the fiber optic adapter mounting cavity.

12. The adapter collar of claim 10, further comprising a labelling surface on a front face of the collar either above or below the fiber optic adapter receiving cavity.

13. The adapter collar of claim 10, wherein the first abutment has a ramped front surface and a rear surface that is normal to first side surface of the body, and wherein the second abutment has a ramped front surface and a rear surface that is normal to second side surface of the body.

\* \* \* \* \*